(12) United States Patent
Brudniok et al.

(10) Patent No.: US 10,836,046 B2
(45) Date of Patent: Nov. 17, 2020

(54) ROBOT GRIPPER

(71) Applicant: KUKA Deutschland GmbH, Augsburg (DE)

(72) Inventors: Sven Brudniok, Langerringen (DE); Wolfgang Schober, Pöttmes (DE)

(73) Assignee: KUKA Deutschland GmbH, Augsburg (DE)

( * ) Notice: Subject to any disclaimer, the term of this patent is extended or adjusted under 35 U.S.C. 154(b) by 417 days.

(21) Appl. No.: 15/756,185

(22) PCT Filed: Aug. 18, 2016

(86) PCT No.: PCT/EP2016/069659
§ 371 (c)(1),
(2) Date: Feb. 28, 2018

(87) PCT Pub. No.: WO2017/036812
PCT Pub. Date: Mar. 9, 2017

(65) Prior Publication Data
US 2018/0281202 A1 Oct. 4, 2018

(30) Foreign Application Priority Data
Aug. 28, 2015 (DE) .......... 10 2015 216 550

(51) Int. Cl.
B25J 15/02 (2006.01)
B25J 15/10 (2006.01)
B25J 15/00 (2006.01)

(52) U.S. Cl.
CPC ....... *B25J 15/0033* (2013.01); *B25J 15/0038* (2013.01); *B25J 15/0042* (2013.01); *B25J 15/0286* (2013.01); *B25J 15/103* (2013.01)

(58) Field of Classification Search
CPC ............... B25J 15/0033; B25J 15/0038; B25J 15/0042; B25J 15/0253; B25J 15/026;
(Continued)

(56) References Cited

U.S. PATENT DOCUMENTS 4,623,183 A 11/1986 Aomori
4,828,276 A * 5/1989 Link .................. B23B 31/1269
279/110
(Continued)

FOREIGN PATENT DOCUMENTS

DE 102013226289 A1 6/2015
EP 2660015 B1 3/2015
(Continued)

OTHER PUBLICATIONS

European Patent Office; Search Report and Written Opinion in related International Patent Application No. PCT/EP2016/069659 dated Dec. 1, 2016; 11 pages.
(Continued)

*Primary Examiner* — Dean J Kramer
(74) *Attorney, Agent, or Firm* — Dorton & Willis, LLP

(57) ABSTRACT

A robot gripper includes a main gripper body that has a connection flange designed to secure the rotational gripper to a tool flange of a robotic arm; a base element that is mounted on the main gripper body such that it can rotate about a first rotational axis by a first rotational joint able to be adjusted automatically by a first drive motor; a first gripper finger mounted such that it can rotate about a second rotational axis aligned parallel to the first rotational axis, relative to the base element, by a second rotational joint which can be adjusted automatically by a second drive motor; and at least one additional gripper finger. The second rotational joint is configured to adjust the first gripper finger individually, using the second drive motor, independently of the at least one additional gripper finger.

17 Claims, 16 Drawing Sheets

(58) Field of Classification Search
CPC .. B25J 15/0266; B25J 15/0273; B25J 15/028; B25J 15/0286; B25J 15/10; B25J 15/103
USPC ........................................................ 294/86.4
See application file for complete search history.

(56) References Cited

U.S. PATENT DOCUMENTS

| | | | | |
|---|---|---|---|---|
| 5,161,846 | A | * | 11/1992 | Yakou .................... B25J 9/1612 294/106 |
| 5,501,498 | A | * | 3/1996 | Ulrich .................... B25J 13/084 294/106 |
| 5,884,951 | A | * | 3/1999 | Long .................... B25J 15/0206 294/106 |
| 6,393,694 | B2 | * | 5/2002 | Roovers ................. B25J 15/103 29/740 |
| 7,556,299 | B2 | * | 7/2009 | Koyama .............. B25J 15/0009 294/106 |
| 8,390,683 | B2 | * | 3/2013 | Tassakos ................ B07C 5/122 348/92 |
| 2015/0151438 | A1 | * | 6/2015 | Hecht .................. B25J 15/0004 294/192 |

FOREIGN PATENT DOCUMENTS

| | | |
|---|---|---|
| JP | 2008157338 A | 7/2008 |
| WO | 2008083995 A1 | 7/2008 |

OTHER PUBLICATIONS

German Patent Office; Office Action in related German Patent Application No. 10 2015 216 550.7 dated May 19, 2016; 6 pages.

* cited by examiner

ROBOT GRIPPER

CROSS-REFERENCE

This application is a national phase application under 35 U.S.C. § 371 of International Patent Application No. PCT/EP2016/069659, filed Aug. 18, 2016 (pending), which claims the benefit of German Patent Application No. DE 10 2015 216 550.7 filed Aug. 28, 2015, the disclosures of which are incorporated by reference herein in their entirety.

TECHNICAL FIELD

The invention relates to a robot gripper, comprising a main gripper body that has a connecting flange, which is designed to secure the rotational gripper to a tool flange of a robot arm; also comprising a base link that is mounted on the main gripper body such that it can rotate about a first axis of rotation by means of a first pivot joint that can be adjusted automatically by a first drive motor; and comprising a first gripper finger, which is mounted such that it can be rotated with respect to the base link about a second axis of rotation, which is aligned parallel to the first axis of rotation, by means of a second pivot joint, which can be adjusted automatically by a second drive motor; and comprising at least one additional gripper finger.

BACKGROUND

The document WO 2008/083995 A1 discloses an apparatus for quality control of a rotationally symmetrical body, where in this case said apparatus comprises a handling system with a gripper for gripping the body and for conveying the body into a working position and at least one electronic camera for optically scanning the body in the working position. In this context the gripper of the handling system comprises gripping fingers with rotationally symmetrical holding elements for holding the body, wherein the holding elements are designed in a manner allowing rotation about their axes of rotation. In this case the holding elements of the gripping fingers of the gripper are connected in each case to a gear wheel such that said holding elements are rotationally rigid. At the same time the gear wheels of all of the gripping fingers of the gripper are indirectly in engagement with a central gear wheel of the gripper by means of at least one further gear wheel; and the gripper comprises a drive mechanism that sets the central gear wheel into a rotational motion.

The document EP 2 660 015 B1 discloses a gripper for manipulating, in particular, tube-shaped, specimen cups, said gripper comprising a gripper base; at least two gripper fingers, each of which has a retaining section for gripping a specimen cup and each of which is disposed on the gripper base such that each gripper finger can be rotated relative to the gripper base about an axis of rotation of the finger, wherein the retaining sections of the gripper fingers are in each case disposed in such a way that they are acentric with respect to the associated axis of rotation of the finger; and comprising a first drive for rotating the gripper fingers, wherein the gripper fingers are coupled to one another in such a way that they are driven by the drive at the same time and are driven in each case at the same rotational speed and direction, wherein the gripper base is disposed on a base body such that said gripper base can rotate and relative to said base body about an axis of rotation of the base that is different from the axes of rotation of the fingers; that a second drive is provided for the purpose of rotating the gripper base relative to the base body and that a control unit is provided for the purpose of controlling the drives in such a way that a combination of movements comprising a rotation of the gripper fingers relative to the gripper base and a rotation of the gripper base relative to the base body results in each case in a substantially linear movement relative to the base body for each of the retaining sections of the gripper fingers.

SUMMARY

The object of the present invention is to provide a robot gripper, with which a multitude of different objects can be securely gripped.

This object is achieved in accordance with the invention by means of a robot gripper, comprising a main gripper body that has a connecting flange, which is designed to secure the rotational gripper to a tool flange of a robot arm; also comprising a base link that is mounted on said main gripper body such that it can rotate about a first axis of rotation by means of a first pivot joint that can be adjusted automatically by a first drive motor; and comprising a first gripper finger, which is mounted such that it can be rotated with respect to the base link about a second axis of rotation, which is aligned parallel to the first axis of rotation, by means of a second pivot joint, which can be adjusted automatically by a second drive motor; and comprising at least one additional gripper finger, wherein the second pivot joint is designed to adjust the first gripper finger individually by means of the second drive motor, independently of the at least one additional gripper finger.

Robot arms with associated robot controllers, in particular industrial robots are working machines that can be equipped for automatic handling and/or processing of objects with tools and are programmable to move along a plurality of axes of motion, for example, with respect to orientation, position and operating sequence. Industrial robots typically comprise a robot arm with a plurality of links, connected by means of joints, and programmable robot controllers (control units) that automatically control or regulate the movement sequences of the robot arm during operation, in order to position and move in space a robot flange of the robot arm. For this purpose the links are moved by means of drive motors, in particular, electrical drives, which are actuated by the robot controller, in particular, with respect to the axes of motion of the industrial robot, said axes of motion representing the degrees of motion of the joints.

The robot may be, for example, an industrial robot, which may be, in particular, an articulated arm robot with axes of rotation, arranged in series one after the other, for example, six axes of rotation. As an alternative, the robot may be a SCARA robot, i.e., a horizontal articulated arm robot, which usually has four degrees of freedom or axes, i.e., joints, of which three joints may be pivot joints, and one joint is a sliding joint. However, the robot can also be a so-called lightweight robot, which may have, in particular, seven axes of rotation arranged in series one after the other.

First of all, lightweight robots differ from conventional industrial robots due to the fact that they exhibit a size that is favorable for the human-machine collaboration and at the same time have a bearing capacity that is high compared to their own weight. In addition, lightweight robots can also be operated, in particular, in a force-controlled and/or torque-controlled manner, instead of only a position-controlled manner, a feature that, for instance, makes the human-robot collaboration much safer. Furthermore, this feature makes it possible to achieve a human-machine collaboration that is so safe that, for example, unintended collisions of the robot arm with persons, such as, for example, machine operators and service technicians, can either be prevented or at least mitigated in such a way that, for example, the machine operators or service technicians, are not injured.

Such a robot arm or such a lightweight robot has preferably more than six degrees of freedom, so that in this respect an overdetermined system is provided, as a result of which the same point in space in the same orientation can be reached in multiple, in particular even an infinite number of different poses of the robot arm. The lightweight robot can respond to external force effects in appropriate ways. In order to measure the force, it is possible to use torque sensors, which are mounted on the joints. These torque sensors can detect or, more specifically, measure the torques or forces in several spatial directions. As an alternative or in addition, the external forces can also be calculated even without sensors, for example, on the basis of the measured motor currents of the drives at the joints of the lightweight robot. As control concepts, it is possible to use, for example, an indirect force control by modeling the lightweight robot as a mechanical resistance (impedance) or a direct force control.

In the same way a SCARA robot may also have torque sensors, which are disposed in each case on the joints and which can detect or rather measure the torques and forces in several spatial directions. As an alternative or in addition, the external forces in a SCARA robot can also be calculated without sensors, for example, on the basis of the measured motor currents of the drive motors at the joints of the SCARA robot.

Since the robot gripper comprises a main gripper body, which is provided with a connecting flange, which is designed to secure the rotational gripper to a tool flange of a robot arm; and, furthermore, a base link that is mounted on said main gripper body such that it can rotate about a first axis of rotation by means of a first pivot joint that can be adjusted automatically by a first drive motor; and comprising a first gripper finger, which is mounted such that it can be rotated with respect to the base link about a second axis of rotation, which is aligned parallel to the first axis of rotation, by means of a second pivot joint, which can be adjusted automatically by a second drive motor; and comprising at least one additional gripper finger; and wherein the second joint is designed to adjust the first gripper finger individually by means of the second drive motor, independently of the at least one additional gripper finger, a multitude of different objects can be gripped securely, because at least the one gripper finger, i.e., the first gripper finger can occupy its own position independently of the respective position of the other gripper fingers. Consequently the gripper fingers can be positioned in a variety of mutual arrangements. In this case the gripper fingers are not coupled, and they are not to be limited to a mere opening movement away from each other and to a mere closing movement towards each other.

The first gripper finger and the at least one additional gripper finger are formed preferably by rigid rods. Since the gripper finger(s) is or are designed as rigid rods, there is no need for complex joints at the gripper fingers; and, as a result, inexpensive and also robust gripper fingers are provided that are, in addition, only slightly susceptible to interference. However, these rigid rods can have a variety of cross sectional shapes. Each of the gripper fingers may also be interchangeably attached to the robot gripper by means of a coupling apparatus, which connects the respective gripper finger to the robot gripper or its main gripper body, intermediary link, or finger support. Thus, the rods may have a general cylindrical outer shell wall; and the rods may have, for example, a circular, square, rectangular, triangular or any other geometric shape in a cross section that extends perpendicular to their longitudinal extent. In particular, the cylindrical outer shell wall of these rods may be a straight cylinder. All of the gripper fingers present on the robot gripper may have the same cross sectional shape. As an alternative, at least one gripper finger may have a different cross sectional shape than the at least one other gripper finger. However, all of the gripper fingers present on the robot gripper may also have individual, i.e., different cross sectional shapes.

In a first basic variant of the robot gripper the first gripper finger may be mounted so as to be individually adjustable with respect to the main gripper body by means of the first pivot joint and the second joint; and there may be only a second gripper finger that is attached to the main gripper body. In another variant the first gripper finger may be mounted so as to be individually adjustable with respect to the main gripper body by means of the first pivot joint and the second joint; and there may be, in addition to the first gripper finger, two other gripper fingers that are both rigidly attached to the main gripper body at a distance from each other. Therefore, such a robot gripper has a total of three gripper fingers, wherein the one gripper finger is adjustable relative to the other two gripper fingers, which are rigidly attached to the main gripper body, by means of the first pivot joint and the second pivot joint. In another variant, in addition to the first gripper finger, which is adjustable by means of the first pivot joint and the second pivot joint, a second and/or third gripper finger may also be independently adjustable with respect to the main gripper body and relative to the other gripper fingers by means of the second and/or third gripper finger's own pivot joint or two of its/their own pivot joints.

Preferably the first drive motor and second drive motor and optionally any other drive motor are provided on the robot gripper.

The main gripper body may have a more or less rotationally symmetrical basic shape. In all design variants the rotationally symmetrical basic shape may have, for example, the shape of a substantially straight circular cylinder. The gripper body may be designed to have, in essence, the shape of a circular disk, for example. However, the rotationally symmetrical basic shape may also have, for example, the shape of a barrel or a truncated cone. The connecting flange may be arranged on a circular first end face of the main gripper body. At a circular end face, located opposite the first circular end face, the first gripper finger may extend perpendicular beyond the plane of the second end face. Even the at least one other gripper finger, i.e., for example, a second, third or even fourth gripper finger, may extend perpendicular beyond the plane of the second end face. Consequently all of the gripper fingers of the robot gripper may extend, aligned with each other in a parallel arrangement, away from the second end face. The longitudinal extents of the gripper fingers may extend, in particular, parallel to the axis of symmetry of the connecting flange, i.e., also extend parallel to an axis of rotation of a tool flange of a robot arm, to which the robot gripper can be attached.

In a specific embodiment of the present invention the robot gripper may comprise a finger support, which comprises the first gripper finger. Said finger support may be mounted on an intermediary link of the robot gripper in a manner allowing rotation about a third axis of rotation, which is aligned parallel to both the first axis of rotation and the second axis of rotation, by means of a third pivot joint, which is automatically adjustable by a third drive motor; and said intermediary link in turn is mounted on the base link in a manner allowing rotation about the second axis of rotation by means of the second pivot joint.

In such an embodiment the links of the robot gripper, said links being formed by the main gripper body, the base link, the intermediary link and the finger support, form a kinematic chain of links, which can be rotatably adjusted by means of the first pivot joint, the second pivot and the third pivot joint. In this respect at least the first gripper finger can be rotationally adjusted with respect to the main gripper body in a total of three degrees of freedom. In this case the three axes of rotation of the first pivot joint, the second pivot joint and the third pivot joint are aligned parallel to each other. As a result, it is possible for the first gripper finger, mounted on the finger support, to occupy not only any position and, in so doing, have any orientation in the plane of the second end face of the main gripper body, but also to reach any position even on any path of motion. Consequently at least the first gripper finger may have a universal freedom of movement relative to the at least one other gripper finger in the plane, i.e., may produce any type of gripper movement. Thus, for example, two opposite gripper fingers may perform a linear movement towards one another and away from each other, but may also perform a pliers-like or scissors-like movement towards each other. That means that a gripper finger can be moved towards the other gripper finger or away from it on a circular path. However, the one gripper finger can also be moved towards the other gripper finger or away from it on any other path.

The base link may have a rotationally symmetrical outer shell wall, on which the base link is rotatably mounted completely inside the outer contour of the main gripper body; an intermediary link of the robot gripper has a rotationally symmetrical outer shell wall, on which the intermediary link is rotatably mounted completely inside the outer contour of the base link; and/or a finger support of the robot gripper has a rotationally symmetrical outer shell wall, on which the finger support is rotatably mounted completely inside the outer contour of the intermediary link. This may mean, in particular, that only the bearing arrangement is located in each case internally. However, it may also be that segments of the drive train extend across several links.

This means that the base link may have a rotationally symmetrical outer shell wall, on which the base link is rotatably mounted completely inside the outer contour of the main gripper body. As an alternative or in addition, an intermediary link of the robot gripper may have a rotationally symmetrical outer shell wall, on which the intermediary link is rotatably mounted completely inside the outer contour of the base link. Furthermore, as an alternative or in addition, a finger support of the robot gripper may have a rotationally symmetrical outer shell wall, on which the finger support is rotatably mounted completely inside the outer contour of the intermediary link.

The intermediary link may have a diameter that corresponds at least more or less to the radius of the main gripper body. In this case the axis of rotation of the intermediary link, i.e., the second axis of rotation may be located at least approximately or exactly at half the length of the radius of the main gripper body. The finger support may have a diameter that is as small as possible; and accordingly the axis of rotation of the finger support, i.e., the third axis of rotation, may be arranged such that it is drawn as far as possible into the vicinity of the outer periphery of the intermediary link. The first gripper finger may be attached to the finger support in such an arrangement that the central geometric axis of the first gripper finger, said geometric axis extending in the longitudinal extent of the first gripper finger, is aligned along the third axis of rotation. Therefore, by adjusting the third pivot joint, the first gripper finger can be rotated about its geometric axis without changing the position of the first gripper finger with respect to the main gripper body and the intermediary link. The kinematic conditions are obtained from the distances between the axes of rotation. Decisive are the absolute lengths between the first and second axis of rotation and between the second and third axis of rotation and the ratio to each other.

The base link may have a profile height pointing in the direction of the first axis of rotation, said profile height being at most as large as the profile height of the main gripper body that points in the direction of the first axis of rotation. An intermediary link of the robot gripper may have a profile height pointing in the direction of the second axis of rotation, said profile height being at most as large as the profile height of the base link that points in the direction of the first axis of rotation. A finger support of the robot gripper may have a profile height that points in the direction of the third axis of rotation and that is at most as large as the profile height of the intermediary link that points in the direction of the second axis of rotation. The net result is a low overall profile height of the robot gripper.

This means that the base link may have a profile height pointing in the direction of the first axis of rotation, said profile height being at most as large as the profile height of the main gripper body that points in the direction of the first axis of rotation. As an alternative or in addition, an intermediary link of the robot gripper may have a profile height pointing in the direction of the second axis of rotation, said profile height being at most as large as the profile height of the base link that points in the direction of the first axis of rotation. Furthermore, as an alternative or in addition, a finger support of the robot gripper may have a profile height pointing in the direction of the third axis of rotation, said profile height being at most as large as the profile height of the intermediary link that points in the direction of the second axis of rotation.

In another specific design variant the robot gripper may be designed in such a way that:

the first pivot joint comprises a first bearing, which surrounds the base link, in particular, a first rolling bearing with an inner ring, an inner ring raceway for rolling bodies, an outer ring and an outer ring raceway, wherein the inner ring is attached to the rotationally symmetrical outer shell wall of the base link; or the inner ring raceway is formed on the rotationally symmetrical outer shell wall of the base link, the second pivot joint comprises a second bearing, which surrounds the intermediary link, in particular, a second rolling bearing with an inner ring, an inner ring raceway for rolling bodies, an outer ring and an outer ring raceway, wherein the inner ring is attached to the rotationally symmetrical outer shell wall of the intermediary link; or the inner ring raceway is formed on the rotationally symmetrical outer shell wall of the intermediary link, and the third pivot joint comprises a third bearing, which surrounds the finger support, in particular, a third rolling bearing with an inner ring, an inner ring raceway for rolling bodies, an outer ring and an outer ring raceway, wherein the inner ring is attached to the rotationally symmetrical outer shell wall of the finger support; or the inner ring raceway is formed on the rotationally symmetrical outer shell wall of the finger support.

Such a bearing design, in particular, rolling bearing design or plain bearing design, makes it possible to achieve a very rigid arrangement of the first pivot joint, the second pivot joint and the third pivot joint. As a result, the second rolling bearing is consequently completely surrounded by the first rolling bearing; and the third bearing is also completely surrounded by the second rolling bearing and in sequence also completely surrounded by the first rolling bearing. In a modified design variant of the robot gripper one or more of the rolling bearings, in particular, all of the rolling bearings, may be replaced by plain bearings.

The first drive motor may be disposed, in particular, inside the main gripper body or the base link; the second drive motor may be disposed, in particular, inside the base link, the intermediary link or the main gripper body; and/or the third drive motor may be disposed, in particular, inside the intermediary link, the finger support, the base link or the main gripper body.

Hence, the first drive motor, the second drive motor and the third drive motor may all be disposed inside the robot gripper. In order to be able to adjust the first pivot joint by means of the first drive motor, the first drive motor can be attached selectively on the drive side or the output side of the first pivot joint, i.e., may be attached to the main gripper body on the drive side or to the base link on the output side, wherein a first motor shaft of the first drive motor is coupled to the respective other link of the main gripper body or the base link. In order to be able to adjust the second pivot joint by means of the second drive motor, the second drive motor can be attached selectively on the drive side or the output side of the second pivot joint or transferred to the drive side, i.e., may be attached on the drive side to the main gripper body, to the base link or on the output side to the intermediary link, wherein a second motor shaft of the second drive motor is coupled to the respective other link of the base link or the intermediary link.

Furthermore, the drive motor of the second shaft may be moved into the main gripper body, in which case the first axis of rotation of the gripper has to be bridged then by the drive train for the second joint; this can be done with or without coupling to the first axis of rotation.

In order to be able to adjust the third pivot joint by means of the third drive motor, the third drive motor can be selectively attached on the drive side or output side of the third pivot joint, or transferred to the drive side, i.e., may be attached on the drive side to the intermediary link, the base link or the main gripper body or on the output side to the finger support, wherein a third motor shaft of the third drive motor is coupled to the respective other link of the intermediary link or the finger support.

Furthermore, the drive motor of the third shaft may be moved into the intermediary link, into the base link or into the main gripper body, wherein then the second axis of rotation alone or the second axis of rotation and the first axis of rotation of the gripper has or have to be bridged by the drive train for the third joint. This can be done with or without coupling to the second or first axis of rotation.

Supply lines, such as, for example, electrical lines, in particular, for supplying electrical drives or sensors of the pivot joints of the robot gripper with electrical energy, may be guided along one or more of the pivot joints. In a first design variant the at least one supply line can be laid at least substantially parallel to the respective axis of rotation in such a way that said supply line bridges the pivot joint concerned and runs from the respective one link of the robot gripper to the next link of the robot gripper. In such a design variant the respective pivot joint may be limited to an angle of rotation of, for example, no more than 400 degrees, in particular, no more than 360 degrees, or less. In another design variant, in which the pivot joint can rotate, in particular, more than 360 degrees, in particular, may rotate several revolutions, it is possible to provide sliding contacts, by means of which the electrical energy may be passed over the pivot joint.

The first drive motor may be designed for force-controlled and/or torque-controlled actuation; the second drive motor may be designed for force-controlled and/or torque-controlled actuation; and/or the third drive motor may be designed for force-controlled and/or torque-controlled actuation. This means that the first drive motor may be designed for force-controlled and/or torque-controlled actuation. As an alternative or in addition, the second drive motor may be designed for force-controlled and/or torque-controlled actuation. Furthermore, as an alternative or in addition, the third drive motor may be designed for force-controlled and/or torque-controlled actuation.

In the case of a force-controlled and/or torque-controlled actuation of the drive motors of the robot gripper, the pivot joints of the robot gripper may be parameterized with respect to their rigidity. To do this, in all of the embodiments the force-controlled and/or torque-controlled actuation of the drive motors of the robot gripper may be carried out by means of a closed loop impedance control or a closed loop admittance control. A gripper controller or a robot controller may be configured to generate a compliance of the gripper fingers on the robot gripper that is suitable for a safe collaboration between human and robot, in particular, by means of a closed loop impedance control or a closed loop admittance control. In such a closed loop compliance control a manual operation can also mean that the gripper fingers on the robot gripper can also be moved manually guided by a machine operator. That means that the gripper fingers of the robot gripper can also be adjusted manually.

The first gripper finger or the second gripper finger and/or the third gripper finger may exhibit a non-circular cross sectional contour in a cross section that extends perpendicular to its/their longitudinal extent.

Therefore, the first gripper finger or the second gripper finger and/or the third gripper finger may have, instead of a circular shape, for example, a square, a rectangular, a triangular, or any other geometric shape in a cross section that extends perpendicular to its/their longitudinal extent. In particular, a cylindrical outer shell wall of the first gripper finger or the second gripper finger and/or the third gripper finger may be a straight cylinder.

Each additional gripper finger, in particular, the second gripper finger and/or the third gripper finger, may be mounted on the main gripper body such that said additional gripper finger can be rotated automatically about an axis of rotation that is aligned parallel to its longitudinal axis. In particular, the second gripper finger and/or the third gripper finger may be mounted on the main gripper body such that said gripper finger can be rotated automatically about the first axis of rotation of the base link.

Moreover, all of the gripper fingers that are present on the robot gripper may have the same cross sectional shape. As an alternative, at least one gripper finger may have a different cross sectional shape than the at least one other gripper finger. However, all of the gripper fingers that are present on the robot gripper may also have individual cross sectional shapes, i.e., mutually different cross sectional shapes.

The other gripper finger may be a second gripper finger or a third gripper finger that is rigidly attached to the main gripper body.

For this purpose the second gripper finger may be arranged so as to be mounted on the main gripper body in such a way that the outer contour of the second gripper finger lies completely inside an enveloping cylindrical surface, which is defined by the outer periphery of the main gripper body. Even the third gripper finger may be arranged so as to be mounted on the main gripper body in such a way that the outer contour of the third gripper finger lies completely inside an enveloping cylindrical surface, which is defined by the outer periphery of the main gripper body. In this way it is possible to provide an entire outer contour of the robot gripper that has no protruding projections that could constitute a risk of injury to a person, who handles or guides a robot arm comprising the robot gripper.

If the second gripper finger or the third gripper finger is arranged so as to be mounted on the main gripper body in such a way that the outer contour of the second gripper finger or the third gripper finger lies completely inside an enveloping cylindrical surface, which is defined by the outer periphery of the main gripper body, then the second gripper finger and/or the third gripper finger may be mounted on a support plate, which projects beyond the outer circular contour of the base link inwards in the direction of the first axis of rotation of the robot gripper. The support plate may be formed by a circular segment disk having a circular arc-shaped contour edge, which is attached to an edge region of the main gripper body; and said circular segment disk projects beyond a circular segment-shaped region of the base link inwards in the direction of the first axis of rotation of the robot gripper. This means that the base link can be rotated in such a way that it passes beneath the support plate, as a result of which, the first gripper finger, which is mounted on the base link, can be rotated directly up against the second gripper finger or the third gripper finger. Consequently the first gripper finger can be rotated up against the second gripper finger or the third gripper finger as far as up to a collision, so that the first gripper finger with the second gripper finger or with the third gripper finger can be rotated towards each other as far as into a closed position, so that even very thin parts, such as, for example, thin sheet metals or individual sheets of paper can be grasped.

In a modification of a circular segment disk-shaped support plate a straight edge of the chord may be replaced by a recessed edge. Such a recessed edge may be formed in a region of the chord on the support plate, said region lying between the second gripper finger and the third gripper finger, which is arranged so as to be spaced apart from the second gripper finger. Such a recess allows the first gripper finger to be moved even between the second gripper finger and the third gripper finger, so that the first gripper finger can be positioned between the second gripper finger and the third gripper finger at least partially or even completely.

The first gripper finger can be mounted in a non-driven manner on the finger support or the intermediary link such that said first gripper finger can be rotated about a passive axis of rotation. As an alternative, the first gripper finger can also be attached rigidly to the finger support or the intermediary link. In such a design variant the gripper finger may have, in particular, a circular cross-sectional contour. If the first gripper finger is mounted on the intermediary link in a manner allowing rotation about a passive axis of rotation, or if the first gripper finger is rigidly mounted, then there is no need for the third drive motor. Preferably in the case of a non-driven, rotatable mounting of the first gripper finger, whether mounted on the finger support or on the intermediary link or rigidly mounted, the first gripper finger is formed with a circular cross-sectional contour. Nevertheless, even the non-driven, rotatably mounted first gripper finger may have any other cross-sectional contour.

The first gripper finger can keep the orientation of its gripping surface parallel to the gripping surface of the second or third finger regardless of its position due to a coupling by elements from the region of the drive train with the main gripper body. Then the first finger cannot be rotated about the third axis; and there is also no third drive motor included.

The first gripper finger or the second gripper finger and/or the third gripper finger may be attached to the finger support by means of a lever, which aligns the respective, i.e., the first gripper finger or the second gripper finger and/or the third gripper finger with its/their longitudinal extent at least substantially or exactly parallel to the third axis of rotation of the third pivot joint, which bears the finger support, and is arranged at a distance from the third axis of rotation.

The first gripper finger or the second gripper finger and/or the third gripper finger may be attached to the finger support in such an arrangement due to the fact that the central geometric axis of the first gripper finger or the second gripper finger or the third gripper finger, said central geometric axis extending in the longitudinal extent of the first gripper finger or the second gripper finger or the third gripper finger, is arranged so as to be offset from the third axis of rotation or the axis, which is parallel to the first axis of rotation, and passes through the pickup point of the second or third gripper finger. Consequently by adjusting the third pivot joint it is possible then to pivot the first gripper finger or the second gripper finger or the third gripper finger about an axis of rotation, which is arranged at a distance, in particular, at a variable distance from its geometrical axis, so that the position of the gripper finger changes with respect to the main gripper body and the intermediary link.

The second gripper finger or the second gripper finger and the third gripper finger may be designed in their shape such that said fingers project laterally with their respective longitudinal extent beyond the main gripper body. For this purpose the first gripper finger may have a shape that allows it to grasp, for example, very small objects even outside the outer contour of the main gripper body. In this case the second gripper finger and/or the first gripper finger can be moved, for example, very close to a boundary wall, so that in this case the main gripper body may be located at a greater distance from the boundary wall. Therefore, such a finger geometry permits gripping an edge, for example, inside a small load carrier.

In another configuration of the gripper fingers, i.e., in alternative joint positions for the first gripper finger or the second gripper finger and/or the third gripper finger, for example, the first gripper finger may protrude laterally beyond the main gripper body on a side diametrically opposite the second gripper finger and the third gripper finger. This arrangement may result in a pliers opening width between the first gripper finger and the second gripper finger or the third gripper finger that may be much larger than the width of the main gripper body. This feature allows objects to be grasped that are much larger in width than the main gripper body itself.

Consequently the first gripper finger may be formed, for example, by an L-shaped link, where in this case a first leg, which is connected to the finger support and which belongs to the L-shaped link, forms the lever; and the other leg, i.e., a second leg of the L-shaped link, forms a gripping section of the first gripper finger, which is aligned in its longitudinal extent parallel to the axes of rotation of the pivot joints of the robot gripper. As an alternative or in addition, the second gripper finger and/or the third gripper finger may also be formed in the same way, for example, by an L-shaped link.

The first gripper finger or the second gripper finger and/or the third gripper finger may comprise at least one outer shell wall section, which is designed to be adjustable with respect to a center axis of the first gripper finger or the second gripper finger and/or the third gripper finger at a distance from this center axis, said center axis extending more or less parallel to the longitudinal extent of the first gripper finger or the second gripper finger and/or the third gripper finger. This means that at least one outer shell wall section of the first gripper finger or the second gripper finger and/or the third gripper finger is formed so as to be resilient. Depending on the cross-sectional contour, for example, of the first gripper finger, the first gripper finger may have a single outer wall or a plurality of outer walls. In the case of a plurality of outer walls, only a single outer wall of the plurality of outer walls may be designed resilient, or several outer walls or all of the outer walls of the first gripper finger may be designed so as to be resilient. In a particular embodiment the respective outer wall may be designed so as to be adjustable in its entirety, in particular, in one piece. As an alternative, the respective outer wall may comprise a plurality of outer wall sections, of which only one outer wall section, several outer wall sections or even all of the outer wall sections may be designed so as to be individually adjustable. An adjustable embodiment of the outer wall sections may mean that although the respective outer wall section is designed to be rigid, it is mounted such that it can be moved. However, an adjustable embodiment of the outer wall sections may also mean that the respective outer wall section is designed to be elastic or is provided with an elastic skin. Therefore, the outer wall sections may be configured very generally in such a way or may be mounted so movably that they passively adapt to the surface of the object to be grasped. The same also applies to the second gripper finger and/or the third gripper finger.

In a specific embodiment the first gripper finger may comprise a plurality of separately adjustable or elastic outer wall sections, which are arranged in the longitudinal extent of said first gripper finger in such a way that they are superimposed on each other. In the case of a first gripper finger, which is triangular in cross section, two of three of the flat outer walls may have, for example, a plurality, for example, seven vertically superimposed, each separately adjustable, outer wall sections. In the case of a first gripper finger, which is rectangular or square in cross section, for example, two or three of four of the flat outer walls may have, for example, a plurality, for example, seven vertically superimposed, each separately adjustable outer wall sections. Each outer wall section can be formed by a spring bracket, which is attached to the first gripper finger. As an alternative or in addition, the outer wall sections may have concave or convex, in particular, free surface geometries.

BRIEF DESCRIPTION OF THE DRAWINGS

Specific embodiments of the invention are explained in greater detail in the following description with reference to the accompanying figures. Specific features of these exemplary embodiments may represent universal features of the invention independently of the actual context, in which they are mentioned, and, as the case may be, can also be considered individually or in combination.

DETAILED DESCRIPTION

Figure 1:
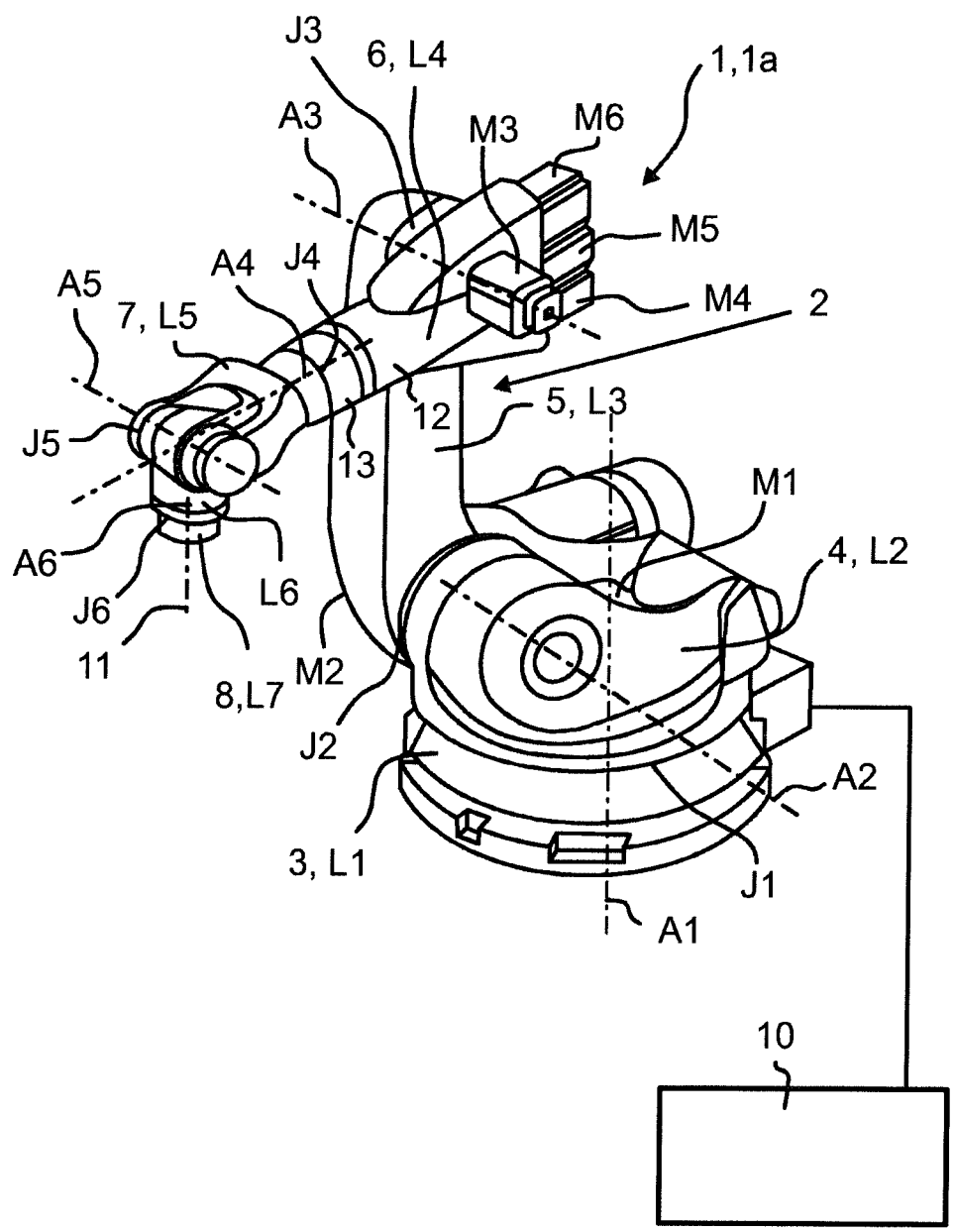
FIG. 1 is a perspective view of an industrial robot in the manner of a six-axis articulated arm robot.

FIG. 1 shows a robot 1, which comprises a robot arm 2, and a robot controller 10. In the case of the present exemplary embodiment the robot arm 2 comprises a plurality of sequentially arranged links L1 to L7, which are connected to each other by means of joints J1 to J6 in such a way that said links can rotate.

The robot controller 10 of the robot 1 is designed or configured to execute a robot program, by means of which the joints J1 to J6 of the robot arm 2 can be automated according to the robot program or automatically adjusted in a manual operation or rotationally moved. For this purpose the robot controller 10 is connected to controllable electric motors M1 to M6, which are designed to adjust the joints J1 to J6 of the robot 1.

In the case of the present exemplary embodiment of an industrial robot 1a the links L1 to L7 are a frame 3 and a rotating table 4, which is mounted in a manner allowing rotation relative to the frame 3 about a vertically extending axis A1. Other links of the robot arm 2 are a link arm 5, a boom arm 6 and a preferably multi-axis robot hand 7 with an attachment device, which is designed as a tool flange 8 and is provided for the purpose of securing a robot gripper 11 of the present invention. The link arm 5 is mounted on the rotating table 4 at the lower end, i.e., on the joint J2 of the link arm 5, said end being also referred to as a link arm bearing head, in such a way that said link arm can pivot about a preferably horizontal axis of rotation A2.

At the upper end of the link arm 5, the link arm 5 is mounted on the first joint J3 such that said link arm in turn can pivot about an axis A3 of the boom arm 6, said axis being also preferably horizontal. Said boom arm carries on its end the robot hand 7 with its preferably three axes of rotation A4, A5, A6. The joints J1 to J6 can be driven in each case by one of the electric motors M1 to M6 in a program controlled manner by means of the robot controller 10. Generally for this purpose a transmission can be provided between each of the links L1 to L7 and the respectively associated electric motors M1 to M6.

Figure 2:
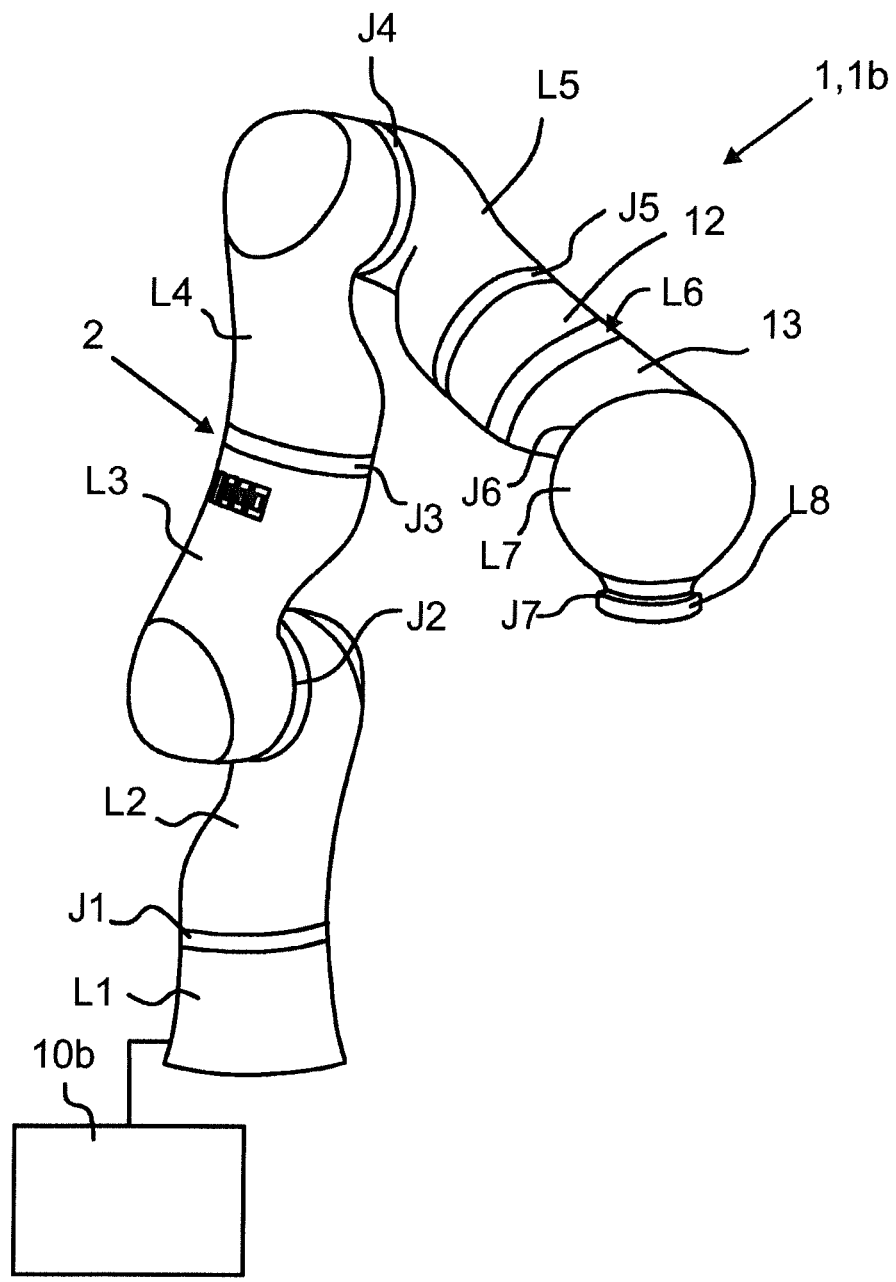
FIG. 2 is a perspective view of a robot in the manner of a lightweight robot.

FIG. 2 shows a robot 1 in an exemplary embodiment as a so-called lightweight robot 1b, which comprises a robot arm 2 and a robot controller 10b. In the case of the present exemplary embodiment the robot arm 2 comprises eight sequentially arranged links L1-L8, which are rotatably connected to each other by means of joints J1-J7. In the case of the exemplary embodiment shown in FIG. 2, the link L8 is formed as a tool flange for the purpose of securing a robot gripper 11 of the present invention.

Figure 3:
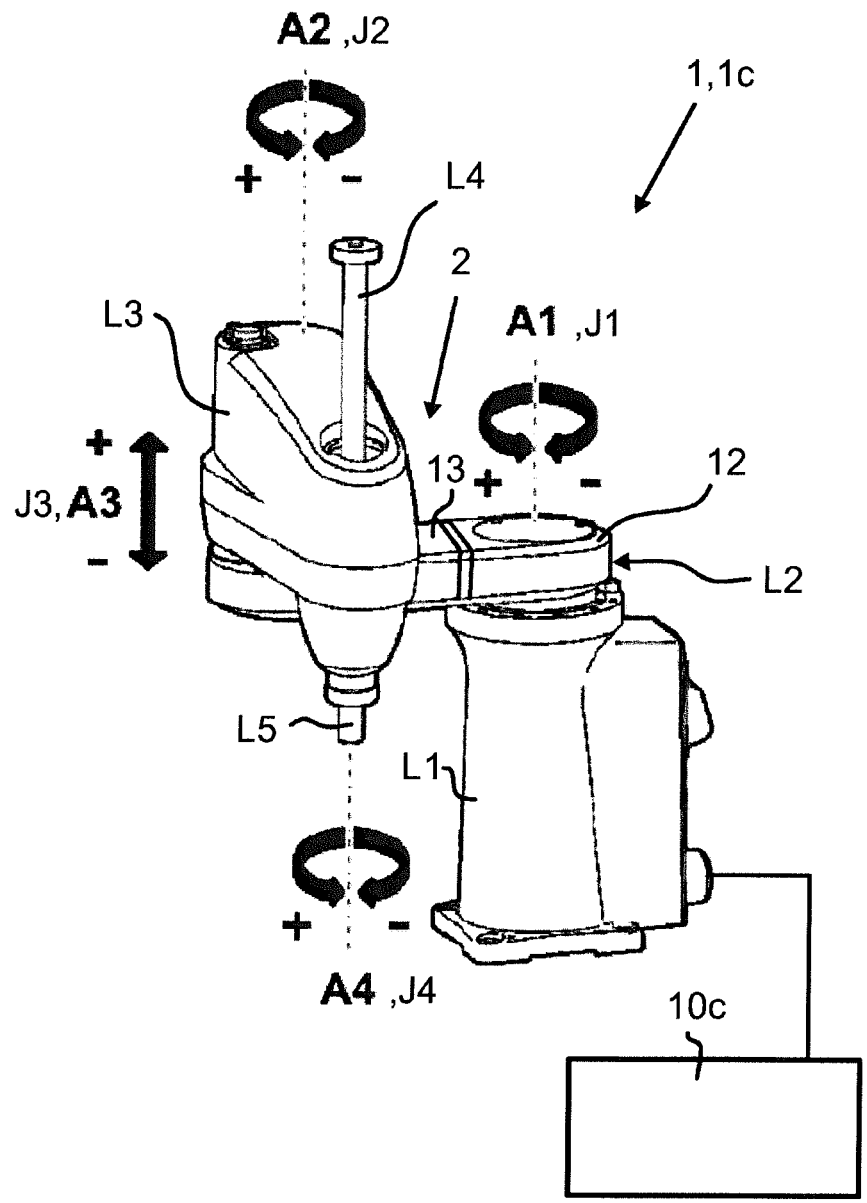
FIG. 3 is a perspective view of a robot in the manner of a SCARA robot.
Figure 4:
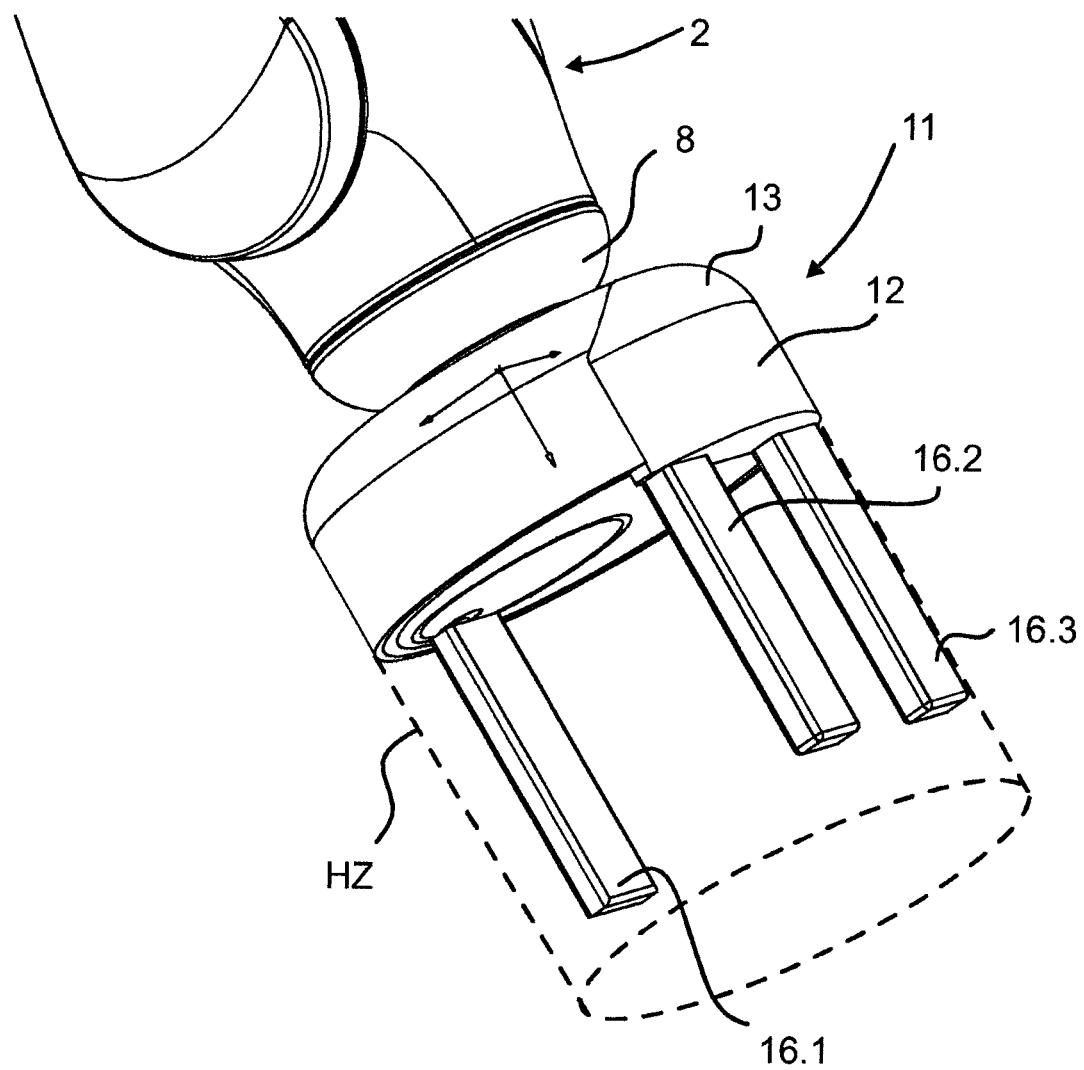
FIG. 4 is a perspective view of an inventive robot gripper, which is attached to a tool flange of a robot arm, according to FIG. 2.

FIG. 3 shows a robot 1 in an exemplary embodiment as a so-called SCARA robot 1c, which comprises a robot arm 2 and a robot controller 10c. In the case of the present exemplary embodiment the robot arm 2 comprises five sequentially arranged links L1-L5, which are rotatably connected to each other by means of joints J1-J4. In the case of the exemplary embodiment shown in FIG. 3, the link L5 is formed as a tool flange for the purpose of securing a robot gripper 11 of the present invention.

FIGS. 4 to 15 show exemplary embodiments of the robot gripper 11 of the invention in schematic form.

The robot gripper 11 has a main gripper body 12, which comprises a connecting flange 13, which is designed for the purpose of securing the rotational gripper 11 to the tool flange 8 of the robot arm 2. In addition, the robot gripper 11 has a base link 14, which is mounted on the main gripper body 12 in a manner allowing rotation about a first axis of rotation D1 by means of a first pivot joint 15.1, which is automatically adjustable by a first drive motor A1. Furthermore, the robot gripper 11 comprises a first gripper finger 16.1, which is mounted in a manner allowing rotation with respect to the base link 14 about a second axis of rotation D2, which is aligned parallel to the first axis of rotation D1, by means of a second pivot joint 15.2, which is automatically adjustable by a second drive motor A2. In addition, the robot gripper 11 has at least one further gripper finger 16.2, 16.3, where in this case the second pivot joint 15.2 is designed to adjust the first gripper finger 16.1 individually by means of the second drive motor A2, independently of the at least one further gripper finger 16.2, 16.3.

In the case of the present exemplary embodiment the robot gripper 11 has a finger support 17, to which the first gripper finger 16.1 is attached. The finger support 17 is mounted on an intermediary link 18 of the robot gripper 11 in a manner allowing rotation about a third axis of rotation D3, which is aligned parallel to both the first axis of rotation D1 and the second axis of rotation D2, by means of a third pivot joint 15.3 which is automatically adjustable by a third drive motor A3. The intermediary link 18 in turn is mounted on the base link 14 in a manner allowing rotation about the second axis of rotation D2 by means of the second pivot joint 15.2.

Figure 6:
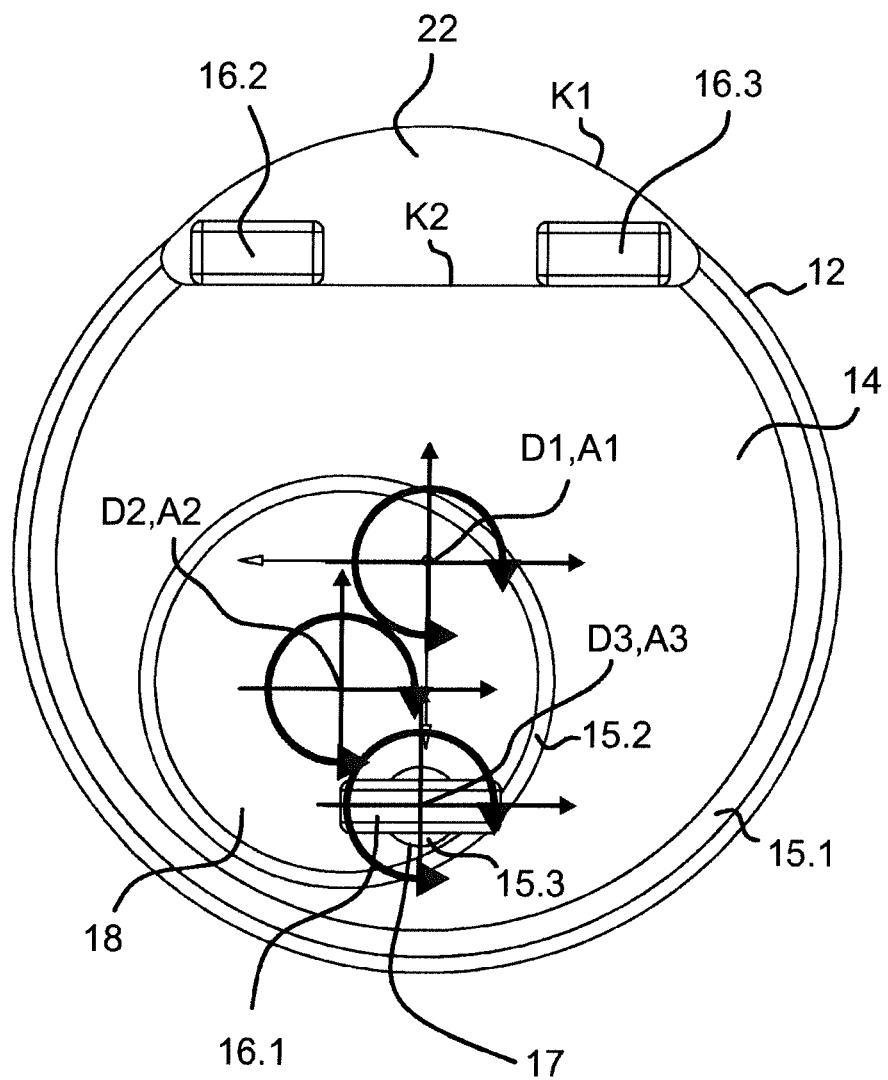
FIG. 6 is a bottom view of the gripper fingers of the robot gripper, according to FIG. 4, with its three axes of rotation.

In such an embodiment the links of the robot gripper 11, which links are formed by the main gripper body 12, the base link 14, the intermediary link 18 and the finger support 17, form a kinematic chain of links, which can be adjusted in a manner allowing rotation, as indicated, in particular, in FIG. 6, by means of the first pivot joint 15.1, the second pivot joint 15.2 and the third pivot joint 15.3. In this respect the first gripper finger 16.1 can be rotationally adjusted with respect to the main gripper body 12 in a total of three degrees of freedom. In this case the three axes of rotation D1, D2 and D3 of the first pivot joint 15.1, the second pivot joint 15.2 and the third pivot joint 15.3 are aligned parallel to each other. As a result, it is possible for the first gripper finger 16.1, mounted on the finger support 17, to occupy not only any position and, in so doing, have any orientation in the plane of the second end face of the main gripper body 12, but also to reach any position even on any path of motion. This applies, in particular, when the distances between the first axis of rotation D1 and the second axis of rotation D2 or between the second axis of rotation D2 and the third axis of rotation D3 are the same. If the length ratios are different, then in that case the areas in the center of the robot gripper 11 cannot possibly be approached.

Consequently the first gripper finger 16.1 may have a universal freedom of motion relative to the second gripper finger 16.2 and the third gripper finger 16.3 in the plane, i.e., may generate any type of gripper movement. Thus, for example, two opposite gripper fingers may perform a linear movement towards one another and away from each other, but may also perform a pliers-like or scissors-like movement towards each other. That means that one gripper finger 16.1 can be moved towards the other gripper finger 16.2 and/or 16.3 or away from it on a circular path, as shown in FIG. 7.

Figure 7:
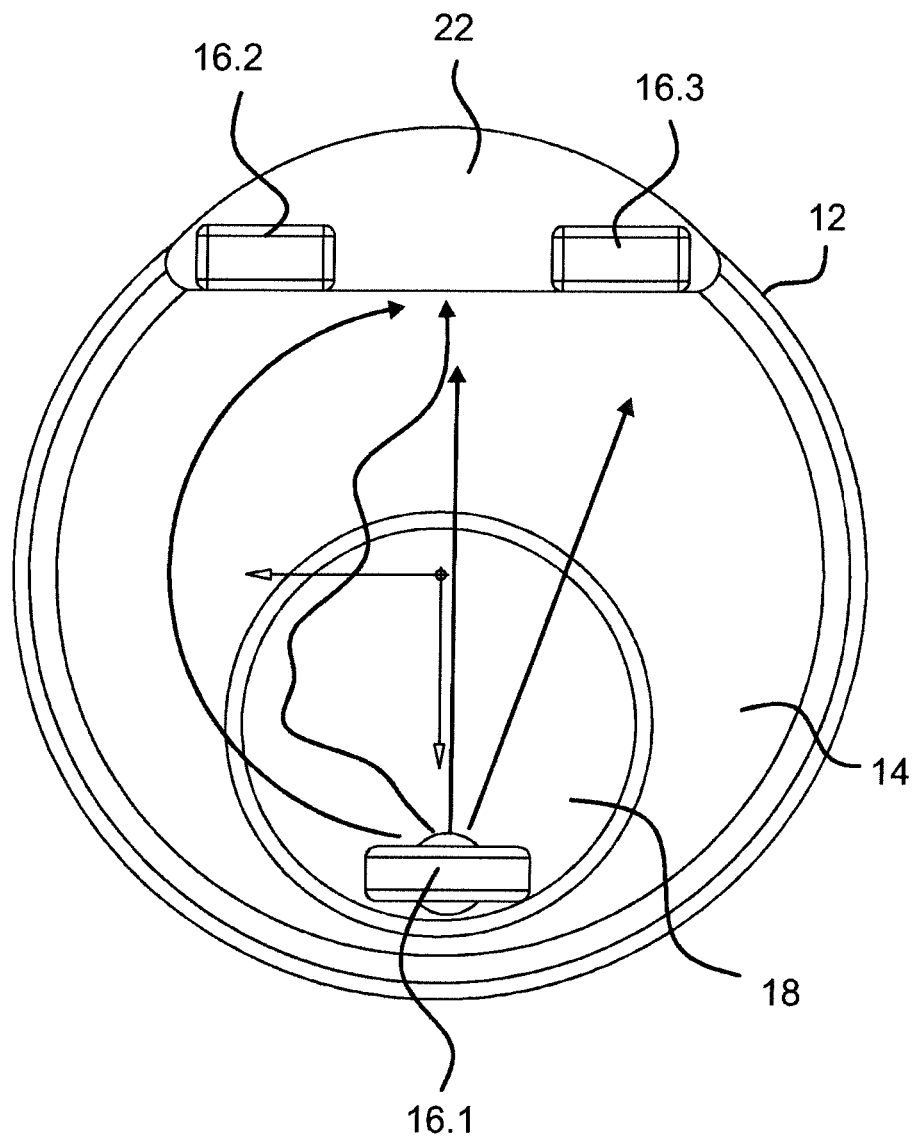
FIG. 7 is a bottom view of the gripper fingers of the robot gripper, according to FIG. 4, with indicated, exemplary paths of motion of the first gripper finger.
Figure 8:
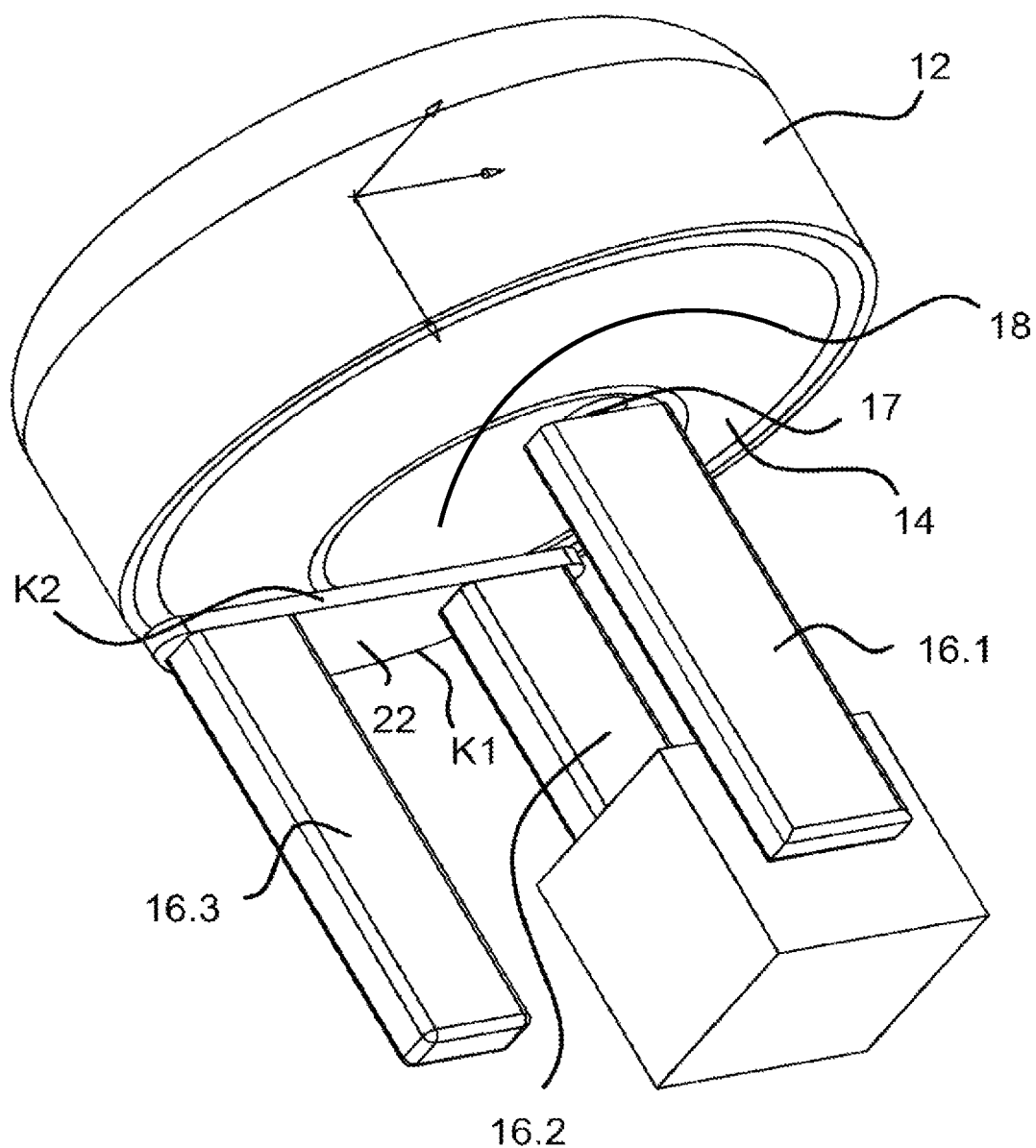
FIG. 8 is a perspective view of the robot gripper, according to FIG. 4, holding an exemplary cube from the outside.
Figure 9:
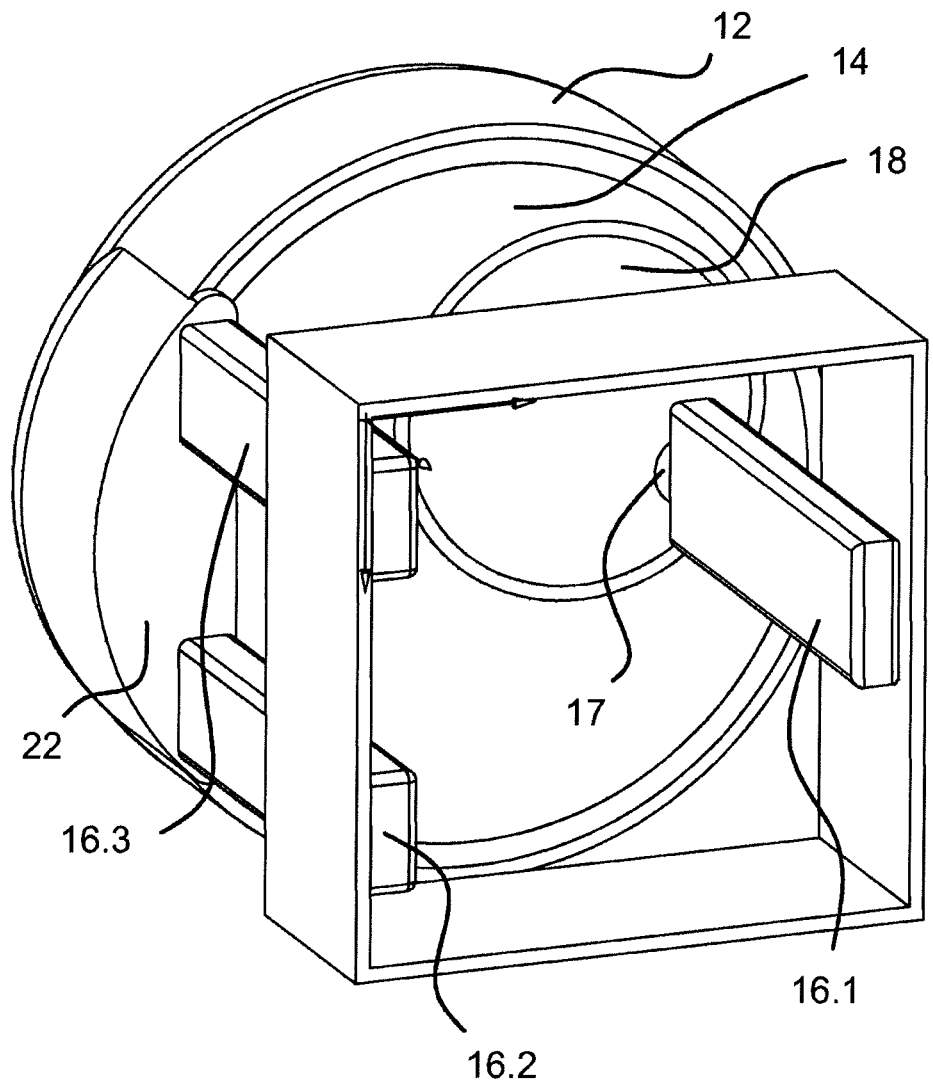
FIG. 9 is a perspective view of the robot gripper, according to FIG. 4, holding an exemplary frame from the inside.
Figure 10:
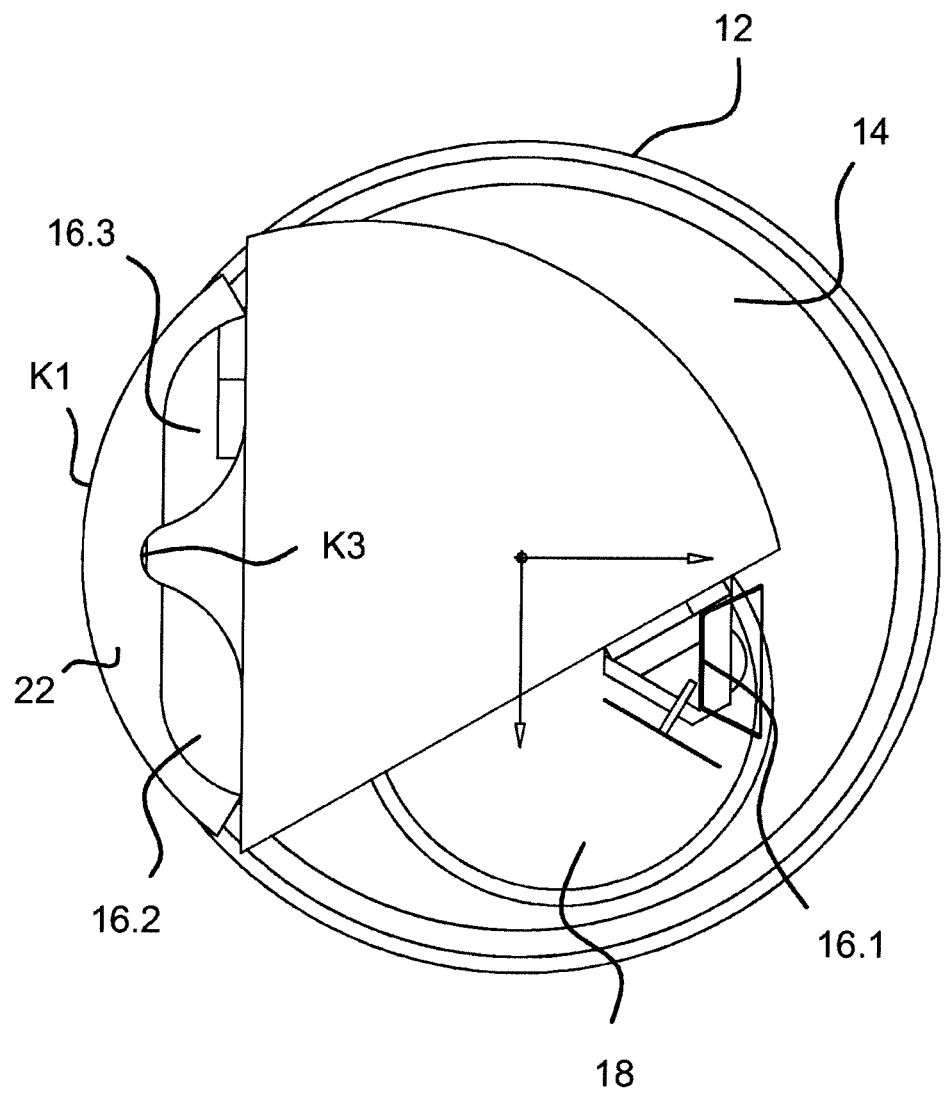
FIG. 10 is a bottom view of the gripper fingers of the robot gripper, according to FIG. 4, with an alternative first gripper finger, which exhibits a triangular cross section and which holds a part exhibiting a circular-sector shape in cross section.

However, the one gripper finger 16.1 can also be moved towards the other gripper finger 16.2 and/or 16.3 or away from it on any other path, as also shown in FIG. 7. In this case the one gripper finger 16.1 can vary its orientation in any number of ways during these movements.

The base link 14 has a rotationally symmetrical outer shell wall, on which the base link 14 is rotatably mounted completely inside the outer contour of the main gripper body 12. The intermediary link 18 of the robot gripper 11 has a rotationally symmetrical outer shell wall, on which the intermediary link 18 is rotatably mounted completely inside the outer contour of the base link 14. The finger support 17 of the robot gripper 11 has a rotationally symmetrical outer shell wall, on which the finger support 17 is rotatably mounted completely inside the outer contour of the intermediary link 18.

Figure 5A:
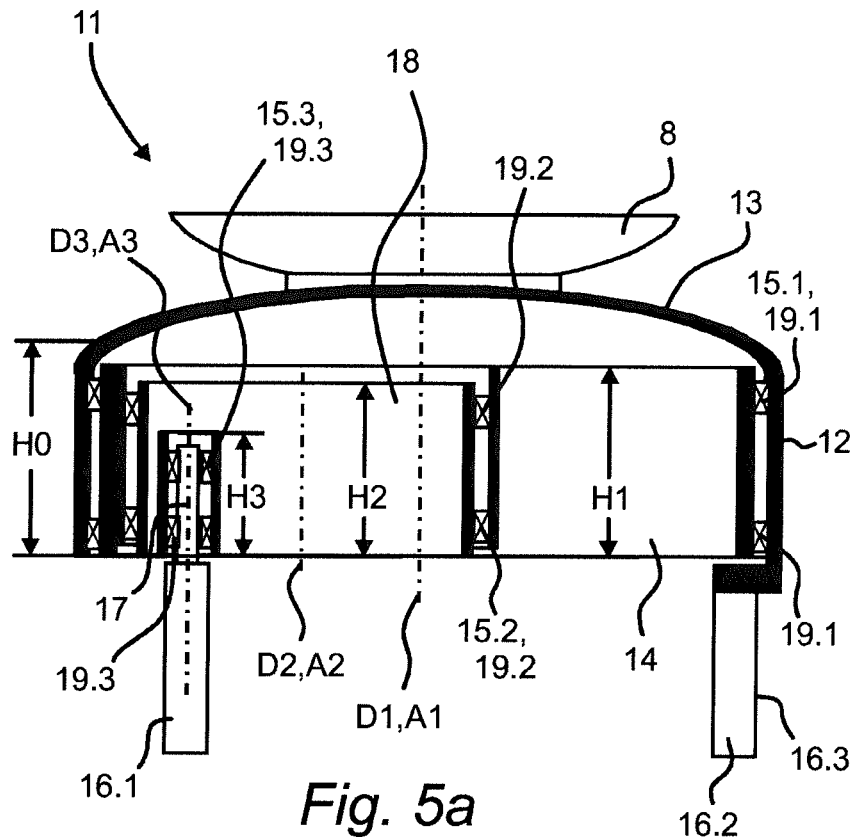
FIG. 5a is a sectional view of the robot gripper, according to FIG. 4, shown alone.

As can be seen, in particular, in FIG. 5, the base link 14 has a profile height H1 that points in the direction of the first axis of rotation D1 and that is at most as large as the profile height H0 of the main gripper body 12 that points in the direction of the first axis of rotation D1. In this case the intermediary link 18 of the robot gripper 11 also has a profile height H2 that points in the direction of the second axis of rotation D2 and that is at most as large as the profile height H1 of the base link 14 that points in the direction of the second axis of rotation D2. The finger support 17 of the robot gripper 11 has a profile height H3 that points in the direction of the third axis of rotation D3 and that is at most as large as the profile height H2 of the intermediary link 18 that points in the direction of the third axis of rotation D3.

In a specific design variant the first pivot joint 15.1 comprises a first rolling bearing 19.1, which surrounds the base link 14 and which comprises an inner ring, an inner ring raceway for rolling bodies, an outer ring and an outer ring raceway, wherein the inner ring is attached to the rotationally symmetrical outer shell wall of the base link 14. As an alternative, the inner ring raceway can be formed on the rotationally symmetrical outer shell wall of the base link 14.

In this case the second pivot joint 15.2 comprises a second rolling bearing 19.2, which surrounds the intermediary link 18 and which comprises an inner ring, an inner ring raceway for rolling bodies, an outer ring and an outer ring raceway, wherein the inner ring is attached to the rotationally symmetrical outer shell wall of the intermediary link 18. As an alternative, the inner ring raceway may be formed on the rotationally symmetrical outer shell wall of the intermediary link 18.

In addition, the third pivot joint 15.3 comprises a third rolling bearing 19.3, which surrounds the finger support 17 and which comprises an inner ring, an inner ring raceway for rolling bodies, an outer ring and an outer ring raceway, wherein the inner ring is attached to the rotationally symmetrical outer shell wall of the finger support 17. As an alternative, the inner ring raceway may be formed on the rotationally symmetrical outer shell wall of the finger support 17. With respect to the bearings, it may hold that the inside ones are located in the outside ones. However, it may be that the segments of the inner supports protrude further and, in so doing, penetrate into the region of the outer supports. In this case the segments may be, for example, segments of the drive, which are located, as shown, for example, in FIG. 5, above the bearing arrangements, but below the base body. This is the case, for example, if the drives have been moved into the main gripper body.

The first gripper finger 16.1 may have a non-circular cross sectional contour in a cross section that extends perpendicular to its longitudinal extent.

In the case of the exemplary embodiments that are shown, the second gripper finger 16.2 and the third gripper finger 16.3 are rigidly attached to the main gripper body 12.

The second gripper finger 16.2 is arranged to be mounted on the main gripper body in such a way that the outer contour of the second gripper finger 16.2 lies completely inside an enveloping cylindrical surface HZ, which is defined by the outer periphery of the main gripper body 12. Similarly in the case of the exemplary embodiments that are shown, even the third gripper finger 16.3 is arranged to be mounted on the main gripper body 12 in such a way that the outer contour of the third gripper finger 16.3 lies, as shown, in particular, in FIG. 4, completely inside an enveloping cylindrical surface HZ, which is defined by the outer periphery of the main gripper body 12.

Figure 5B:
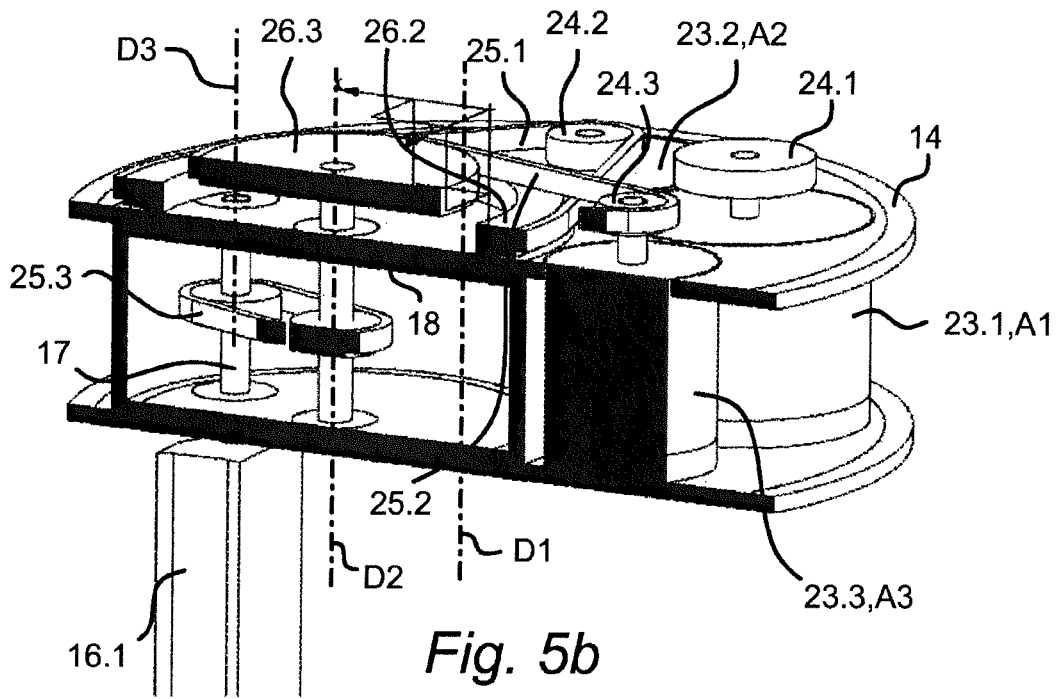
FIG. 5b is a perspective, sectional view of an embodiment of the robot gripper with an exemplary drive assembly.

One exemplary drive assembly of the robot gripper 11, which may be combined with the type of mounting described above, but can also be combined together with a different type of mounting, is shown in FIG. 5b. In the case of the present exemplary embodiment the robot gripper has a total of three motors 23.1, 23.2, 23.3. All three motors 23.1, 23.2, 23.3 are located inside the base link 14. Thus, the first motor 23.1 is mounted on the output side and moves with the base link 14. The first motor 23.1 moves the first axis of rotation D1. The first motor 23.1 carries on its motor shaft a spur gear 24.1, which engages in a gear ring that exhibits internal teeth and that is secured to the main gripper body 12. The second motor 23.2 moves the second axis of rotation D2. If the first motor 23.1 is moved, then the second motor 23.2 moves accordingly. For this purpose a first toothed drive pulley 24.2 is mounted on the motor shaft of the second motor 23.2. A first timing belt 25.1 runs on the first toothed drive pulley 24.2. The first timing belt 25.1 also runs on a first toothed output pulley 26.2, which is attached to the intermediary link 18. When the second motor 23.2 rotates, the intermediary link 18 is also rotated. The third motor 23.3 carries on its motor shaft a second toothed drive pulley 24.3. A second timing belt 25.2 runs on the second toothed drive pulley 24.2. The second timing belt 25.2 also runs on a second toothed output pulley 26.3, which is coupled by means of a third timing belt 25.3 to the finger support 17. Therefore, the third motor 23.3 is moved on the drive side in front of the axis of rotation D2 and bridges the axis of rotation D2 and exhibits an additional coupling due to the third timing belt 25.3. When the third motor 23.3 rotates, the finger support 17 is also rotated and, thus, the first gripper finger 16.1 is consequently rotated.

Figure 11:
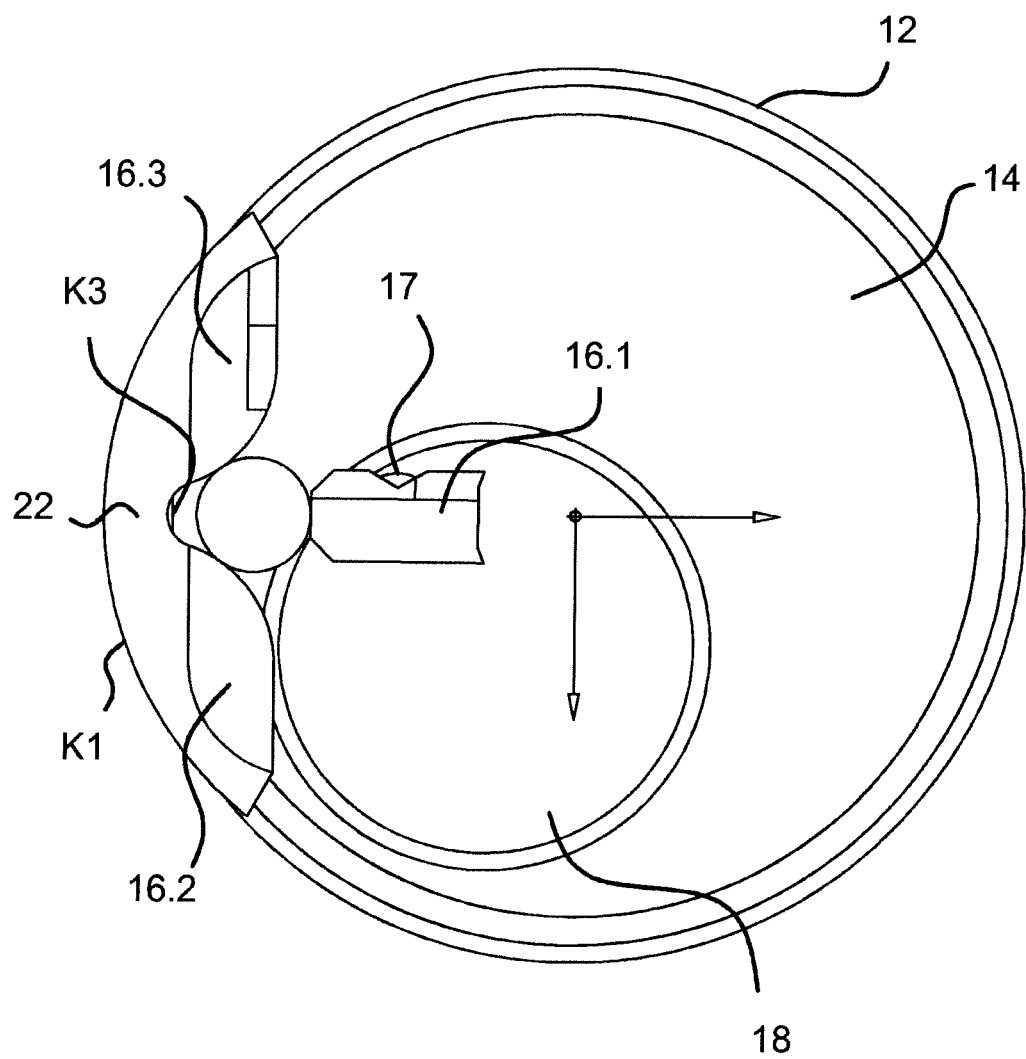
FIG. 11 is a bottom view of the gripper fingers of the robot gripper, according to FIG. 4, holding an exemplary pin.
Figure 12A:
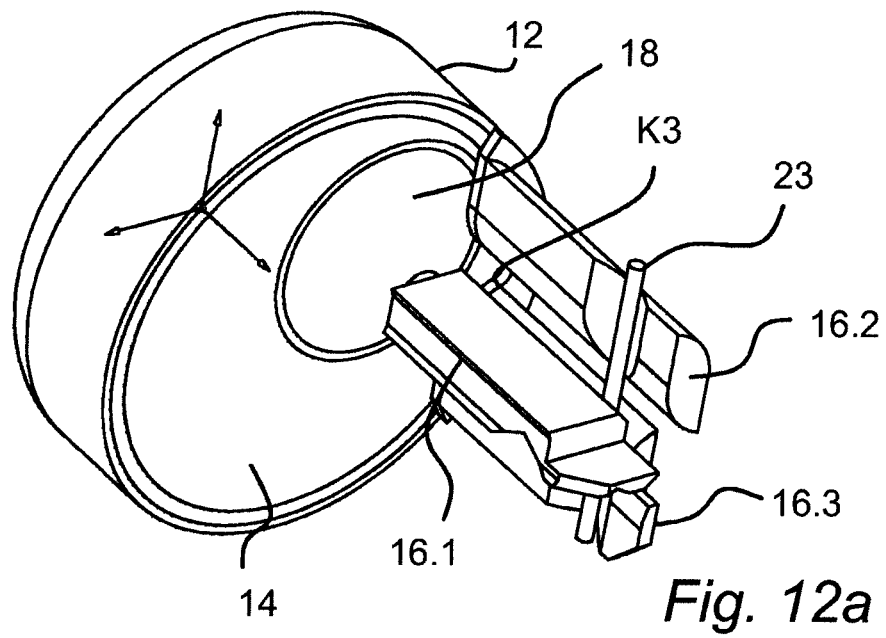
FIG. 12a is a perspective view of the robot gripper, according to FIG. 4, holding an exemplary thin pin with an end face of the first gripper finger.
Figure 12B:
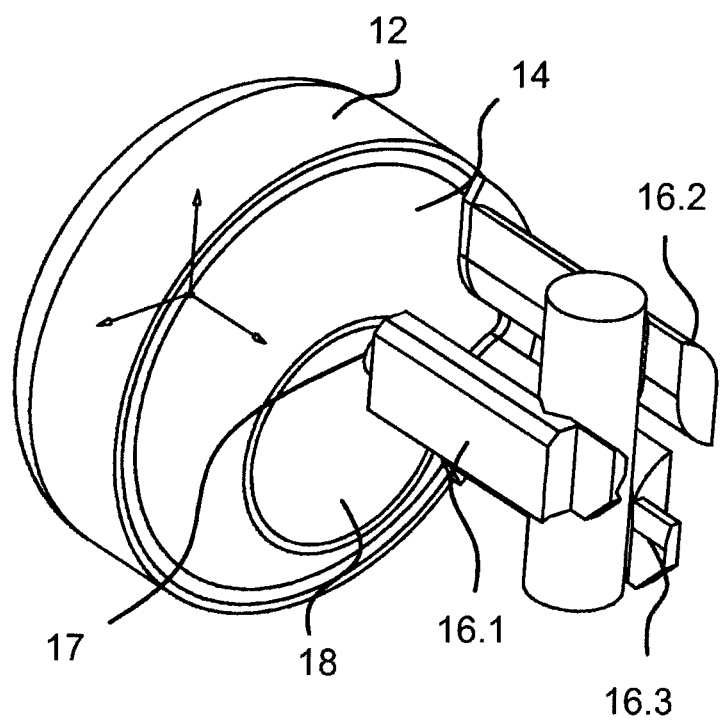
FIG. 12b is a perspective view of the robot gripper, according to FIG. 4, holding an exemplary thicker pin with a broad side of the first gripper finger.

When the second gripper finger 16.2 and the third gripper finger 16.3, as designed in the exemplary embodiment, are rigidly attached to the main gripper body 12, then the second gripper finger 16.2 and the third gripper finger 16.3 may be mounted on a support plate 22, which projects beyond the outer circular contour of the base link 12 inwards in the direction of the first axis of rotation D1 of the robot gripper 11, as shown, for example, in FIG. 6. The support plate 22 may be formed by a circular segment disk having a circular arc-shaped contour edge K1, which is attached to an edge region of the main gripper body 12; and said circular segment disk projects beyond a circular segment-shaped region of the base link 14 inwards in the direction of the first axis of rotation D1 of the robot gripper 11. This means that the base link 14 can be rotated, as shown, for example, in FIG. 8, in such a way that it passes beneath the support plate 22, as a result of which, the first gripper finger 16.1, which is mounted on the base link 14, can be rotated directly up against the second gripper finger 16.2 or the third gripper finger 16.3, as can be seen in FIG. 11 and FIG. 12a, FIG. 12b. Consequently the first gripper finger 16.1 can be rotated up against the second gripper finger 16.2 or the third gripper finger 16.3 as far as up to a collision, so that the first gripper finger 16.1 with the second gripper finger 16.2 or with the third gripper finger 16.3 can be rotated towards each other as far as into a closed position, so that even very thin parts, such as, for example, thin sheet metals, individual sheets of paper or thin pins 23 can be grasped.

In a modification of a circular segment disk-shaped support plate 22 a straight edge K2 (FIG. 6) of the chord may be replaced by a recessed edge K3 (FIG. 10 to FIG. 12b). Such a recessed edge K3 may be formed in a region of the chord on the support plate 22, said region lying between the second gripper finger 16.2 and the third gripper finger 16.3, which is arranged so as to be spaced apart from the second gripper finger 16.2. Such a recess allows the first gripper finger 16.1 to be moved even between the second gripper finger 16.2 and the third gripper finger 16.3, so that the first gripper finger 16.1 can be positioned between the second gripper finger 16.2 and the third gripper finger 16.3 at least partially or even completely. An inward movement is also possible, if the edge is not recessed, but for this purpose the gripper fingers, in particular, the first gripper finger, exhibit a corresponding shape, in particular, in the region above the gripper surface.

Figure 13:
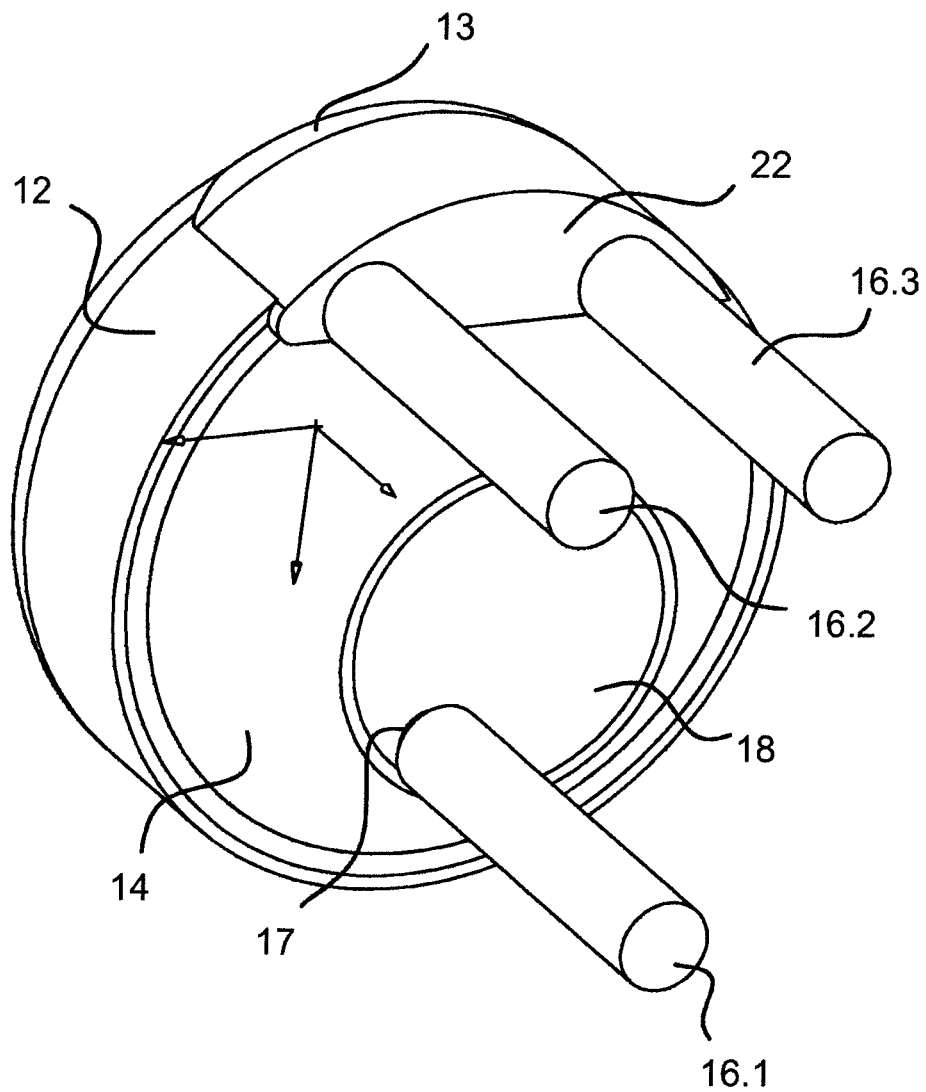
FIG. 13 is a perspective view of the robot gripper, according to FIG. 4, with a non-driven first gripper finger.

In the design variant shown in FIG. 13, the first gripper finger 16.1 is designed to be non-driven and, thus, is rigidly attached to the finger support 17 or to the intermediary link 18.

Figure 14A:
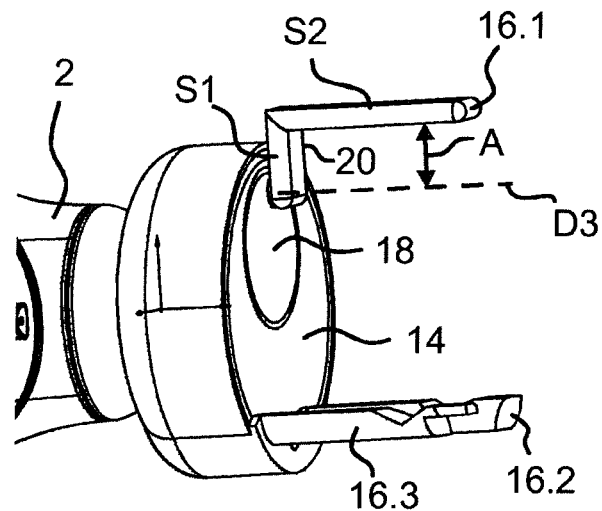
FIG. 14a is a perspective view of the robot gripper, according to FIG. 4, with an L-shaped first gripper finger in a wide position.
Figure 14B:
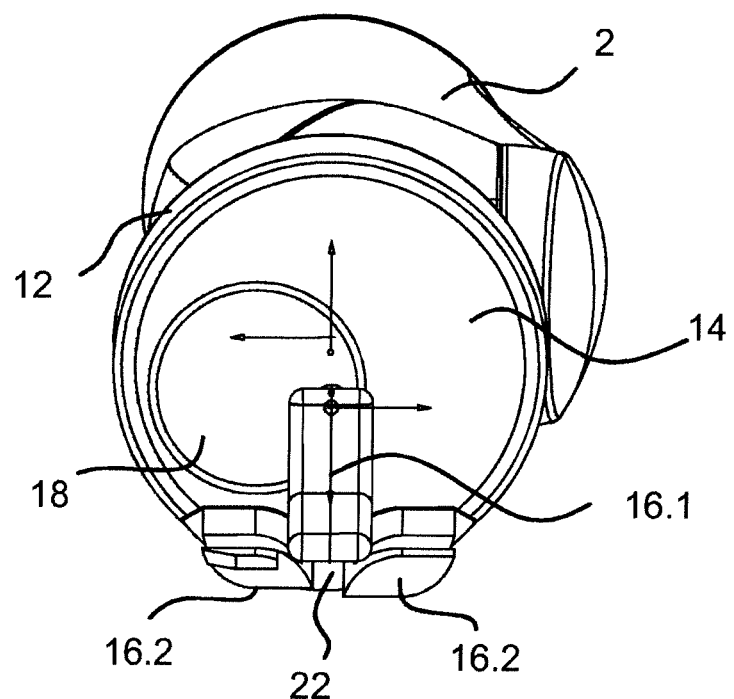
FIG. 14b is a perspective view of the robot gripper, according to FIG. 4, with an L-shaped first gripper finger in a narrow position.

As the variants in FIG. 14a and FIG. 14b show, the first gripper finger 16.1 may be attached to the finger support 17 by means of a lever 20, which aligns the first gripper finger 16.1 with its longitudinal extent at least substantially or exactly parallel to the third axis of rotation D3 of the third pivot joint 15.3, which bears the finger support 17, and is arranged at a distance A from the third axis of rotation D3.

Consequently the first gripper finger 16.1 and/or the second gripper finger 16.2 and/or the third gripper finger 16.3 may be formed, for example, by an L-shaped link, where in this case a first leg 51, which is connected to the finger support 17 and which belongs to the L-shaped link, forms the lever 20; and the other leg, i.e., a second leg S2 of the L-shaped link, forms a gripping section of the first gripper finger 16.1, which is aligned in its longitudinal extent parallel to the axes of rotation D1-D3 of the pivot joints 15.1 to 15.3 of the robot gripper 11, as shown in FIG. 14a and FIG. 14b.

Figure 15A:
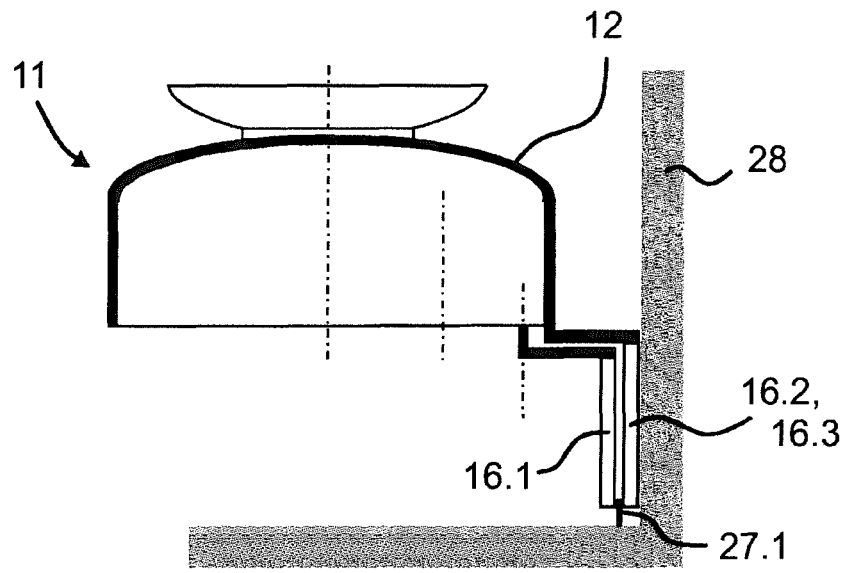
FIG. 15a is in schematic form a sectional view of the robot gripper with gripper fingers, projecting laterally beyond the main gripper body, in a first configuration for grasping very small objects, in particular, in the vicinity of a boundary wall.

FIG. 15a shows a first configuration, in which the robot gripper 11 is designed with gripper fingers 16.1, 16.2, 16.3, projecting laterally beyond the main gripper body 12, in the form of L-shaped links, for the purpose of gripping very small objects 27.1, in particular, in the vicinity of a boundary wall 28.

In the design variant shown, the second gripper finger 16.2 or the second gripper finger 16.2 and the third gripper finger 16.3 may be designed in their shape such that said fingers project laterally with their respective longitudinal extent beyond the main gripper body 12. For this purpose the first gripper finger 16.1 exhibits a shape that allows it to grasp very small objects 27.1 even outside the outer contour of the main gripper body 12. In this case the second gripper finger 16.2 and the first gripper finger 16.1 can be moved very close to the boundary wall 28, so that in this case the main gripper body 12 is located at a greater distance from the boundary wall 28.

Figure 15B:
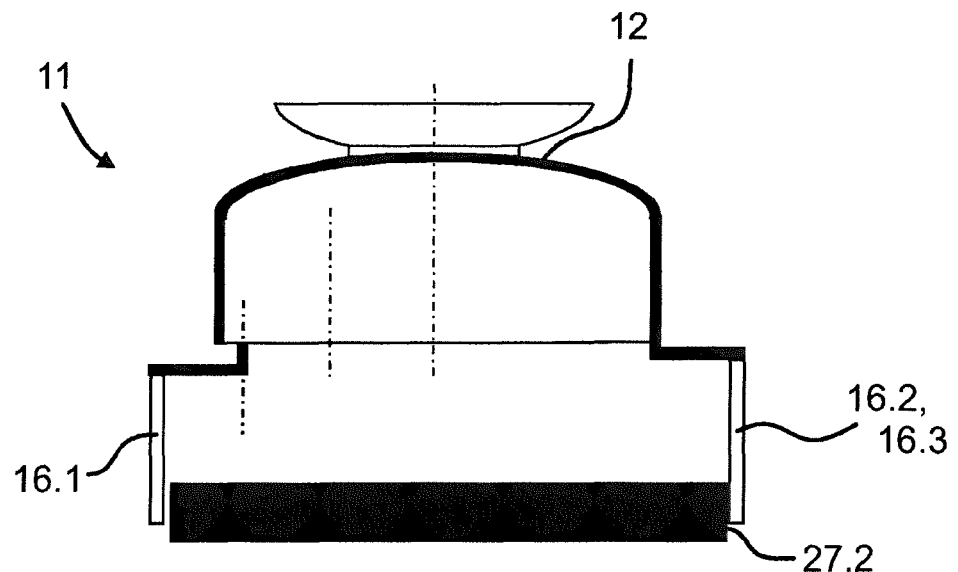
FIG. 15b is in schematic form a sectional view of the robot gripper with gripper fingers, projecting beyond the main gripper body on diametrically opposite sides, in a second configuration for grasping objects that are larger than the main gripper body itself.

FIG. 15b shows a second configuration, in which the robot gripper 11 is designed with gripper fingers 16.1, 16.2, 16.3, projecting beyond the main gripper body 12 on diametrically opposite sides, in the form of L-shaped links, for the purpose of gripping objects 27.2 that are larger than the main gripper body 12.

In this configuration of the gripper fingers 16.1, 16.2, 16.3, i.e., in alternative joint positions for the first gripping finger 16.1 or the second gripper finger 16.2 and/or the third gripper finger 16.3, the first gripper finger 16.1 projects, as shown, laterally beyond the main gripper body 12 on a side, diametrically opposite the second gripper finger 16.2 and the third gripper finger 16.3. This arrangement may result in a pliers opening width between the first gripper finger 16.1 and the second gripper finger 16.2 or the third gripper finger 16.3 that is much larger than the width of the main gripper body 12 itself.

Figure 16:
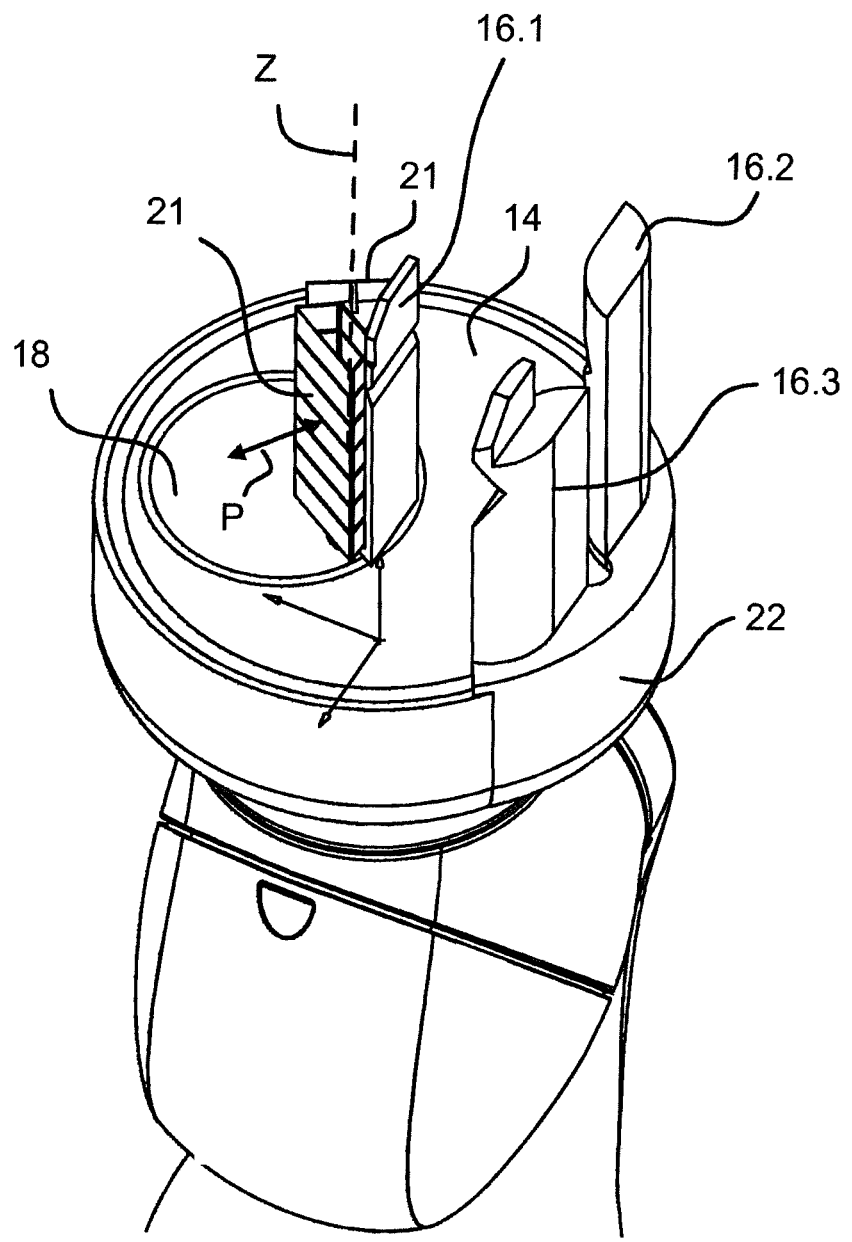
FIG. 16 is a perspective view of the robot gripper, according to FIG. 4, with adjustable outer shell wall sections.

FIG. 16 shows an exemplary design variant, in which the first gripper finger 16.1 comprises at least one outer shell wall section 21, which is designed to be adjustable, as indicated by the arrow P, with respect to a center axis Z of the first gripper finger 16.1 at a distance from this center axis Z, said center axis extending more or less parallel to the longitudinal extent of the first gripper finger 16.1.

In a specific embodiment, as shown in FIG. 16, the first gripper finger 16.1 may have a plurality of separately adjustable or elastic outer wall sections 21, which are arranged in the longitudinal extent of said first gripper finger in such a way that they are superimposed on each other. In the case of a first gripper finger 16.1, which is triangular in cross section, two of three of the flat outer walls may have a plurality, for example, seven vertically superimposed, each separately adjustable, outer wall sections 21. Each outer wall section 21 may be formed by a spring bracket, which is attached to the first gripper finger 16.1.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

The invention claimed is:

1. A robot gripper, comprising:
   a main gripper body including a connecting flange configured to couple the gripper to a tool flange of a robot arm;
   a base link mounted on the main gripper body for rotation about a first axis of rotation by a first pivot joint, the first pivot joint automatically adjustable by a first drive motor;
   a first gripper finger supported on the main gripper body by a second pivot joint for rotation with respect to the base link about a second axis of rotation that is parallel to the first axis of rotation, the second pivot joint automatically adjustable by a second drive motor;
   at least one additional gripper finger supported on the main gripper body;
   wherein the second pivot joint is configured to individually adjust the first gripper finger by the second drive motor independently of the at least one additional gripper finger;
   an intermediate link mounted on the base link for rotation about the second axis of rotation by the second pivot joint; and
   a finger support coupled with the first gripper finger;
   the finger support mounted on the intermediate link of the robot gripper by a third pivot joint for rotation about a third axis of rotation that is aligned parallel to both the first axis of rotation and the second axis of rotation, the third pivot joint automatically adjustable by a third drive motor.

2. The robot gripper of claim 1, wherein the first gripper finger is mounted on the base link.

3. The robot gripper of claim 1, wherein at least one of:
   the base link comprises a rotationally symmetrical outer shell wall on which the base link is rotatably mounted completely inside an outer contour of the main gripper body;
   the intermediate link of the robot gripper has a rotationally symmetrical outer shell wall, on which the intermediate link is rotatably mounted completely inside the outer contour of the base link; or the finger support of the robot gripper has a rotationally symmetrical outer shell wall, on which the finger support is rotatably mounted completely inside the outer contour of the intermediate link.

4. The robot gripper of claim 3, wherein:
the base link has a profile height in a direction parallel to the first axis of rotation that is not greater than a profile height of the main gripper body in the direction parallel to the first axis of rotation;
the intermediate link of the robot gripper has a profile height in a direction parallel to the second axis of rotation that is not greater than the profile height of the base link in the direction parallel to the first axis of rotation; and
the finger support of the robot gripper has a profile height in a direction parallel to the third axis of rotation that is not greater than the profile height of the intermediate link in the direction parallel to the second axis of rotation.

5. The robot gripper of claim 1, wherein:
the first pivot joint comprises a first bearing that surrounds the base link;
the second pivot joint comprises a second bearing that surrounds the intermediate link; and
the third pivot joint comprises a third bearing that surrounds the finger support.

6. The robot gripper of claim 5, wherein at least one of:
the first bearing is a first rolling bearing with an inner ring, an inner ring raceway for rolling bodies, an outer ring, and an outer ring raceway, wherein the inner ring is attached to a rotationally symmetrical outer shell wall of the base link, or the inner ring raceway is formed on a rotationally symmetrical outer shell wall of the base link;
the second bearing is a second rolling bearing with an inner ring, an inner ring raceway for rolling bodies, an outer ring, and an outer ring raceway, wherein the inner ring is attached to a rotationally symmetrical outer shell wall of the intermediate link, or the inner ring raceway is formed on a rotationally symmetrical outer shell wall of the intermediate link; or
the third bearing is a third rolling bearing with an inner ring, an inner ring raceway for rolling bodies, an outer ring, and an outer ring raceway, wherein the inner ring is attached to a rotationally symmetrical outer shell wall of the finger support, or the inner ring raceway is formed on the rotationally symmetrical outer shell wall of the finger support.

7. The robot gripper of claim 1, wherein at least one of:
the first drive motor is disposed inside the main gripper body or the base link;
the second drive motor is disposed inside the base link, the intermediate link, or the main gripper body; or
the third drive motor is disposed inside the intermediate link, the finger support, the base link, or the main gripper body.

8. The robot gripper of claim 1, wherein at least one of:
the first drive motor is configured for at least one of force-controlled or torque-controlled actuation;
the second drive motor is configured for at least one of force-controlled or torque-controlled actuation; or
the third drive motor is configured for at least one of force-controlled or torque-controlled actuation.

9. The robot gripper of claim 1, wherein the first gripper finger has a non-circular cross-sectional contour in a cross section perpendicular to its longitudinal extent.

10. The robot gripper of claim 1, wherein the at least one additional gripper finger is rigidly attached to the main gripper body.

11. The robot gripper of claim 1, wherein the at least one additional gripper finger is mounted on the main gripper body in a manner allowing automatic rotation about an axis of rotation aligned parallel to a longitudinal axis of the at least one additional gripper.

12. The robot gripper of claim 11, wherein:
the at least one additional gripper finger comprises at least a second gripper finger and a third gripper finger; and
at least one of the second gripper finger or the third gripper finger is mounted on the main gripper body in a manner allowing automatic rotation about the first axis of rotation of the base link.

13. The robot gripper of claim 11, wherein:
the at least one additional gripper finger comprises at least a second gripper finger and a third gripper finger; and
at least one of the second gripper finger or the third gripper finger is configured to be secured on the main gripper body in such a way that an outer contour of the respective gripper finger lies completely inside an enveloping cylindrical surface that is defined by the outer periphery of the main gripper body.

14. The robot gripper of claim 1, wherein the first gripper finger is mounted in a non-driven manner on one of the finger support or the intermediate link in a manner allowing rotation about a passive axis of rotation.

15. The robot gripper of claim 1, wherein:
the at least one additional gripper finger comprises at least a second gripper finger and a third gripper finger; and
at least one of the first gripper finger, the second gripper finger, or the third gripper finger is attached to a respective finger support by a lever that aligns the respective gripper finger such that a longitudinal extent of the gripper finger is at least substantially parallel to an axis of rotation of a respective pivot joint that bears the finger support, and the gripper finger is spaced a distance from the axis of rotation.

16. A robot gripper, comprising:
a main gripper body including a connecting flange configured to couple the gripper to a tool flange of a robot arm;
a base link mounted on the main gripper body for rotation about a first axis of rotation by a first pivot joint, the first pivot joint automatically adjustable by a first drive motor;
a first gripper finger supported on the main gripper body by a second pivot joint for rotation with respect to the base link about a second axis of rotation that is parallel to the first axis of rotation, the second pivot joint automatically adjustable by a second drive motor;
at least one additional gripper finger supported on the main gripper body;
wherein the second pivot joint is configured to individually adjust the first gripper finger by the second drive motor independently of the at least one additional gripper finger;
wherein the at least one additional gripper finger comprises at least a second gripper finger and a third gripper finger; and
at least one of the first gripper finger, the second gripper finger, or the third gripper finger is attached to a respective finger support by a lever that aligns the respective gripper finger such that a longitudinal extent of the gripper finger is at least substantially parallel to an axis of rotation of a respective pivot joint that bears the finger support, and the gripper finger is spaced a distance from the axis of rotation;

wherein the at least one first gripper finger, second gripper finger, or third gripper finger is spaced a variable, distance from the axis of rotation.

17. A robot gripper, comprising:

a main gripper body including a connecting flange configured to couple the gripper to a tool flange of a robot arm;

a base link mounted on the main gripper body for rotation about a first axis of rotation by a first pivot joint, the first pivot joint automatically adjustable by a first drive motor:

a first gripper finger supported on the main gripper body by a second pivot joint for rotation with respect to the base link about a second axis of rotation that is parallel to the first axis of rotation, the second pivot joint automatically adjustable by a second drive motor; and at least one additional gripper finger supported on the main gripper body;

wherein the second pivot joint is configured to individually adjust the first gripper finger by the second drive motor independently of the at least one additional gripper finger;

wherein the at least one additional gripper finger comprises at least a second gripper finger and a third gripper finger; and at least one of the first gripper finger, the second gripper finger, or the third gripper finger comprises at least one outer shell wall section that is adjustable with respect to a center axis of the respective gripper finger at a distance from the center axis, the center axis extending substantially parallel to a longitudinal extent of the respective gripper finger.

\* \* \* \* \*